(12) United States Patent
Balta et al.

(10) Patent No.: US 11,746,906 B1
(45) Date of Patent: Sep. 5, 2023

(54) LIP SEALS AND RELATED METHODS

(71) Applicant: Bal Seal Engineering, LLC, Foothill Ranch, CA (US)

(72) Inventors: Miquel Balta, Irvine, CA (US); Marc Soriano, Irvine, CA (US); Serdar Eren, Apeldoorn (NL)

(73) Assignee: Bal Seal Engineering, LLC, Foothill Ranch, CA (US)

( * ) Notice: Subject to any disclaimer, the term of this patent is extended or adjusted under 35 U.S.C. 154(b) by 0 days.

(21) Appl. No.: 18/088,040

(22) Filed: Dec. 23, 2022

Related U.S. Application Data

(63) Continuation-in-part of application No. 18/051,805, filed on Nov. 1, 2022.

(51) Int. Cl.
*F16J 15/3204* (2016.01)

(52) U.S. Cl.
CPC ................. *F16J 15/3204* (2013.01)

(58) Field of Classification Search
CPC .... F16J 15/00; F16J 15/16; F16J 15/50; F16J 15/52; F16J 15/32; F16J 15/3204; F16J 15/3208; F16J 15/3212; F16J 15/3216; F16J 15/322; F16J 15/3232; F16J 15/3236
USPC ...................................................... 277/309
See application file for complete search history.

(56) References Cited

U.S. PATENT DOCUMENTS

| | | |
|---|---|---|
| 4,434,863 A | 3/1984 | Garrett |
| 4,578,856 A | 4/1986 | Butler |
| 4,613,143 A | 9/1986 | Butler |
| 4,655,945 A | 4/1987 | Balsells |
| 4,804,290 A | 2/1989 | Balsells |
| 4,805,943 A | 2/1989 | Balsells |

(Continued)

FOREIGN PATENT DOCUMENTS

| | | |
|---|---|---|
| CN | 110307336 A | 10/2019 |
| JP | 2555588 B2 | 11/1996 |

(Continued)

OTHER PUBLICATIONS

Garlock Rotary Shaft Seal, PS-SEAL® Rotary Shaft Seal, 1.4571/316Ti Case, Dual Back-to-Back Lips with F Lip Clamp Ring Side and F Lip Case Side, GYLON Standard Support Ring, FKM Static Seal, 15.90 mm Shaft Size X 30.00 mm Bore Size X 8.00 mm Width, 3.00 mm Preload, 10 bar Max Pressure, PTFE Shaft Seals, Garlock Part: MEC04-14199, 2 pages, Retrieved on May 31, 2023 from: https://www.garlock.com/product/mec04-14199?setcontextlanguagecode=en.

(Continued)

*Primary Examiner* — Nathan Cumar
(74) *Attorney, Agent, or Firm* — KOS IP Law LLP

(57) ABSTRACT

Seal assemblies, gaskets, bearing assemblies, and their components can be used as pre-packaged seal systems and pre-packaged seal and bearing systems. The seal assemblies can be orientated in different configurations for different applications. Gaskets to restrict flow and gaskets with memory lips to operate as sealing lips can be included to increase the number of sealing points. In a pre-packaged configuration, the cylinder can be a straight cylinder, a stepped cylinder, or a split cylinder. Bearing assemblies can be pre-packaged with the sealing assemblies and service grease may optionally be used to provide lubrication and limit fluid incursion into the spring cavities.

30 Claims, 6 Drawing Sheets

(56) References Cited

U.S. PATENT DOCUMENTS

| | | | |
|---|---|---|---|
| 4,848,776 A | 7/1989 | Winckler | |
| 5,072,070 A | 12/1991 | Balsells | |
| 5,079,388 A | 1/1992 | Balsells | |
| 5,091,606 A | 2/1992 | Balsells | |
| 5,117,066 A | 5/1992 | Balsells | |
| 5,134,244 A | 7/1992 | Balsells | |
| 5,161,806 A | 11/1992 | Balsells | |
| 5,265,890 A | 11/1993 | Balsells | |
| 5,358,224 A | 10/1994 | Balsells | |
| 5,474,309 A | 12/1995 | Balsells | |
| 5,575,487 A | 11/1996 | Balsells | |
| 5,599,027 A | 2/1997 | Balsells | |
| 5,979,904 A | 11/1999 | Balsells | |
| 5,984,316 A | 11/1999 | Balsells | |
| 5,992,856 A | 11/1999 | Basells et al. | |
| 6,050,572 A | 4/2000 | Balsells et al. | |
| 6,161,838 A | 12/2000 | Balsells | |
| 6,264,205 B1 | 7/2001 | Balsells | |
| 6,641,141 B2 | 11/2003 | Schroeder | |
| 7,111,821 B2 | 9/2006 | Promper | |
| 7,210,398 B2 | 5/2007 | Balsells | |
| 7,464,750 B2 | 12/2008 | Schapel et al. | |
| 7,883,094 B2 | 2/2011 | Vila | |
| 8,096,559 B2 | 1/2012 | Cook | |
| 8,328,202 B2 | 12/2012 | Foster et al. | |
| 8,544,850 B2 | 10/2013 | Balsells et al. | |
| 8,684,362 B2 | 4/2014 | Balsells et al. | |
| 9,033,345 B2 | 5/2015 | Hintenlang et al. | |
| 9,194,497 B2 | 11/2015 | Rastegar | |
| 9,234,591 B2 | 1/2016 | Dilmaghanian et al. | |
| 9,285,034 B2 | 3/2016 | Balsells et al. | |
| 9,357,684 B2 | 5/2016 | Foster | |
| 9,829,028 B2 | 11/2017 | Changsrivong et al. | |
| 10,145,473 B2 | 12/2018 | Angiulli et al. | |
| 10,190,690 B2 * | 1/2019 | Colineau | F16J 15/3232 |
| 10,263,368 B2 | 4/2019 | Young et al. | |
| 10,520,091 B2 * | 12/2019 | Niknezhad | F16J 15/3212 |
| 2002/0153664 A1 | 10/2002 | Schroeder | |
| 2004/0026868 A1 | 2/2004 | Dahlheimer | |
| 2006/0125189 A1 | 6/2006 | Peschke et al. | |
| 2007/0057472 A1 | 3/2007 | Hatch | |
| 2010/0237565 A1 | 9/2010 | Foster | |
| 2011/0006486 A1 | 1/2011 | Niknezhad | |
| 2011/0036433 A1 | 2/2011 | Spahr | |
| 2013/0043661 A1 | 2/2013 | Binder et al. | |
| 2014/0191451 A1 | 7/2014 | Moss | |
| 2014/0312570 A1 | 10/2014 | Foster | |
| 2016/0047473 A1 | 2/2016 | Foster et al. | |
| 2016/0223086 A1 | 8/2016 | Balsells et al. | |
| 2016/0273656 A1 | 9/2016 | Lopez | |
| 2016/0290507 A1 | 10/2016 | Chapagain et al. | |
| 2017/0172018 A1 * | 6/2017 | Dilmaghanian | H05K 9/0015 |
| 2017/0261108 A1 | 9/2017 | Soler et al. | |
| 2017/0328474 A1 | 11/2017 | Balsells | |
| 2018/0112778 A1 * | 4/2018 | Dilmaghanian | F16J 15/164 |
| 2018/0119857 A1 | 5/2018 | Balsells | |
| 2018/0266562 A1 | 9/2018 | Balsells | |
| 2020/0208743 A1 | 7/2020 | Duong et al. | |
| 2020/0360919 A1 | 11/2020 | Guzman et al. | |
| 2022/0161018 A1 | 5/2022 | Mitze et al. | |
| 2022/0161019 A1 | 5/2022 | Mitze et al. | |
| 2022/0161021 A1 | 5/2022 | Mitze et al. | |

FOREIGN PATENT DOCUMENTS

| | | |
|---|---|---|
| WO | 2009019137 A1 | 2/2009 |
| WO | 2014140379 A1 | 9/2014 |
| WO | WO 2022/109589 | 5/2022 |
| WO | WO 2022/109590 A1 | 5/2022 |
| WO | WO 2022/109591 A2 | 5/2022 |
| WO | 2023014742 A1 | 2/2023 |

OTHER PUBLICATIONS

Hameder, Brian, Patent Search Report, Patentability Search, Double Seal Assembly, Cadinal Intellectual Property, Evanston, IL, dated May 31, 2023, 16 pages.

Rotary Oil Seal, Rotary Seal Design Guide, Parker, Parker Hannifin Corporation, 2006, 400 pages, Retrieved on May 31, 2023 from: https://www.parker.com/content/dam/Parker-com/Literature/Engineered-Polymer-Systems/5350.pdf.

SKF Radial shaft, PTFE seals, 2 pages, Retrieved on May 31, 2023 from: https://www.skf.com/id/products/industrial-seals/power-transmission-seals/radial-shaft-seals/general-industrial-applications/ptfe.

* cited by examiner

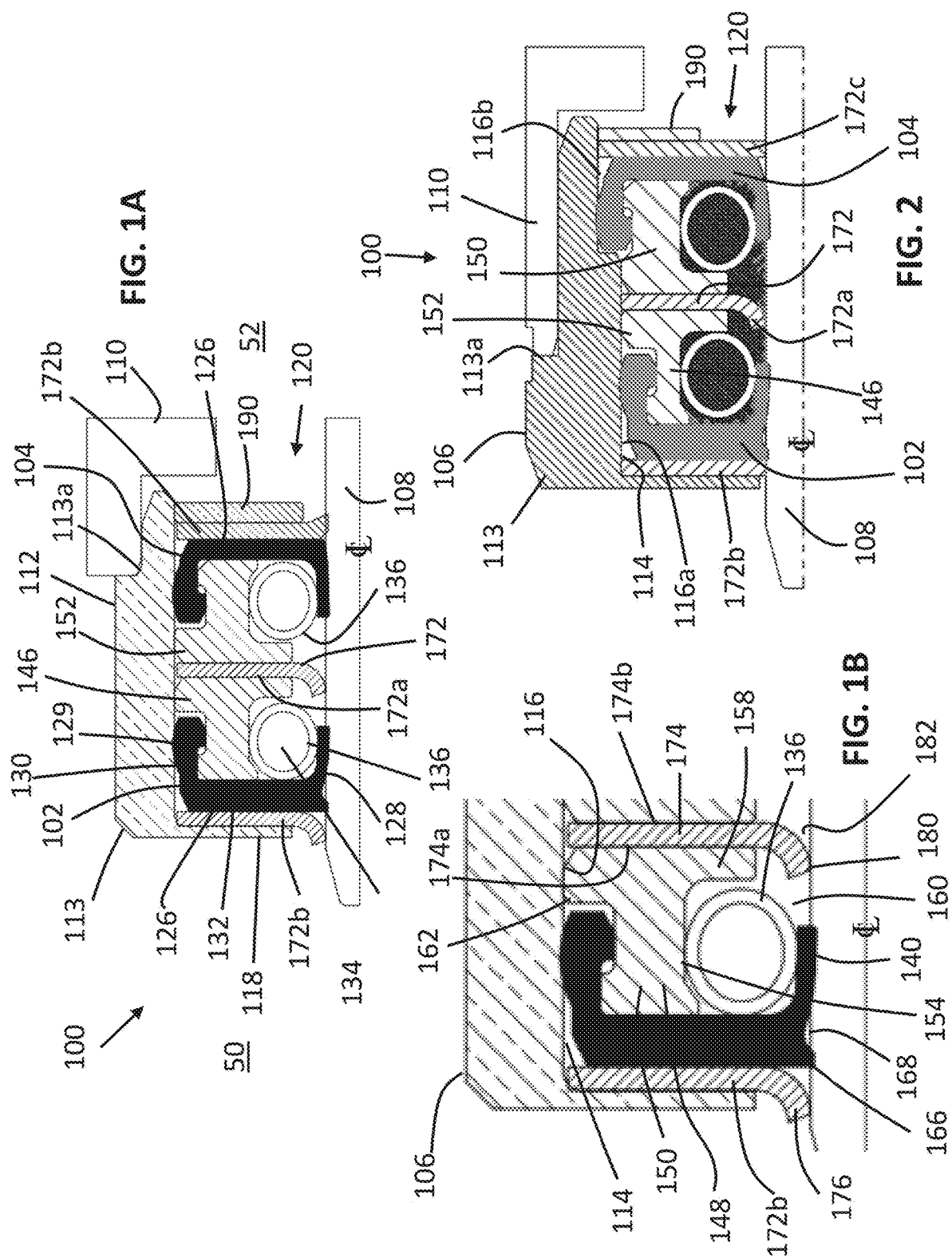

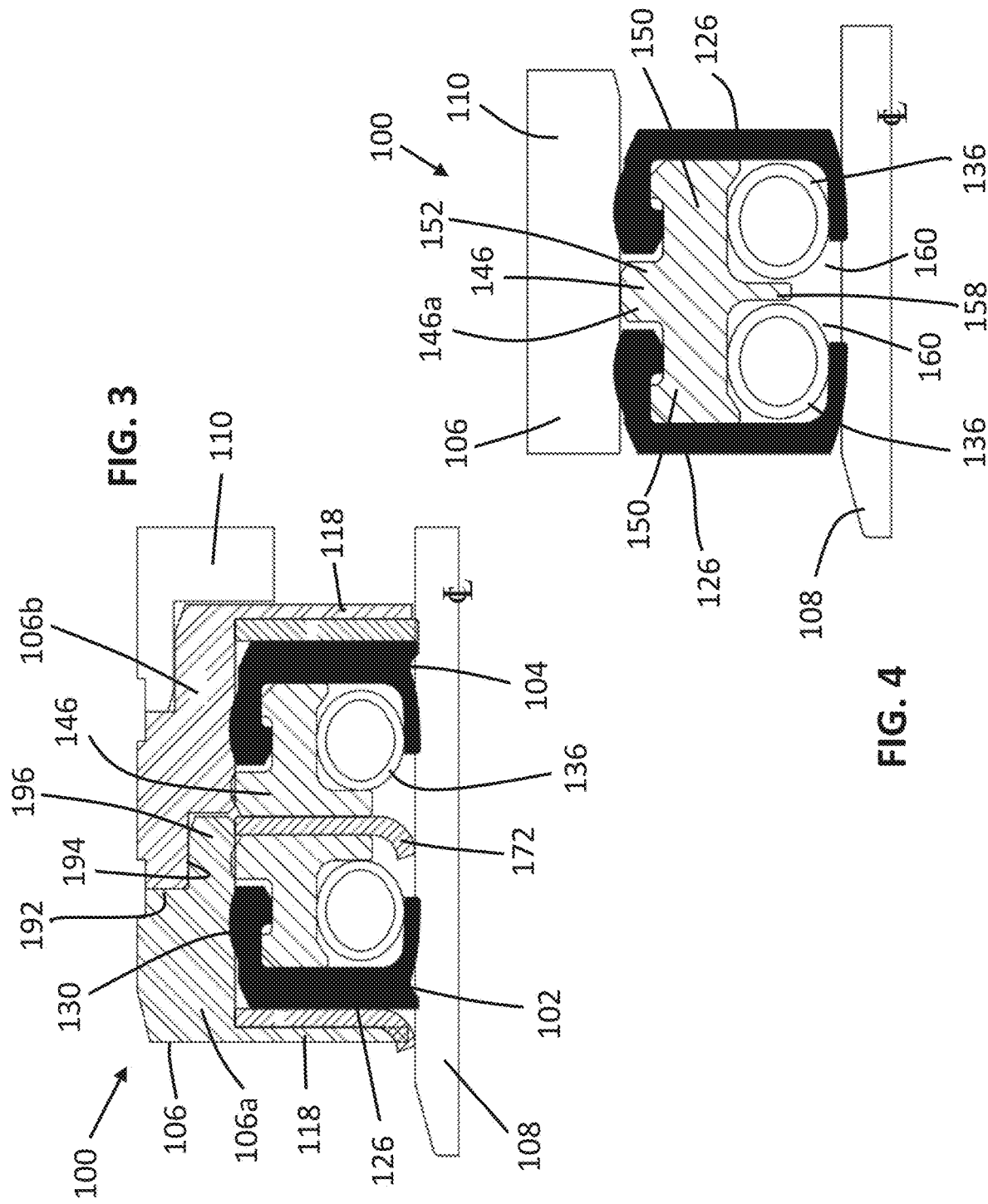

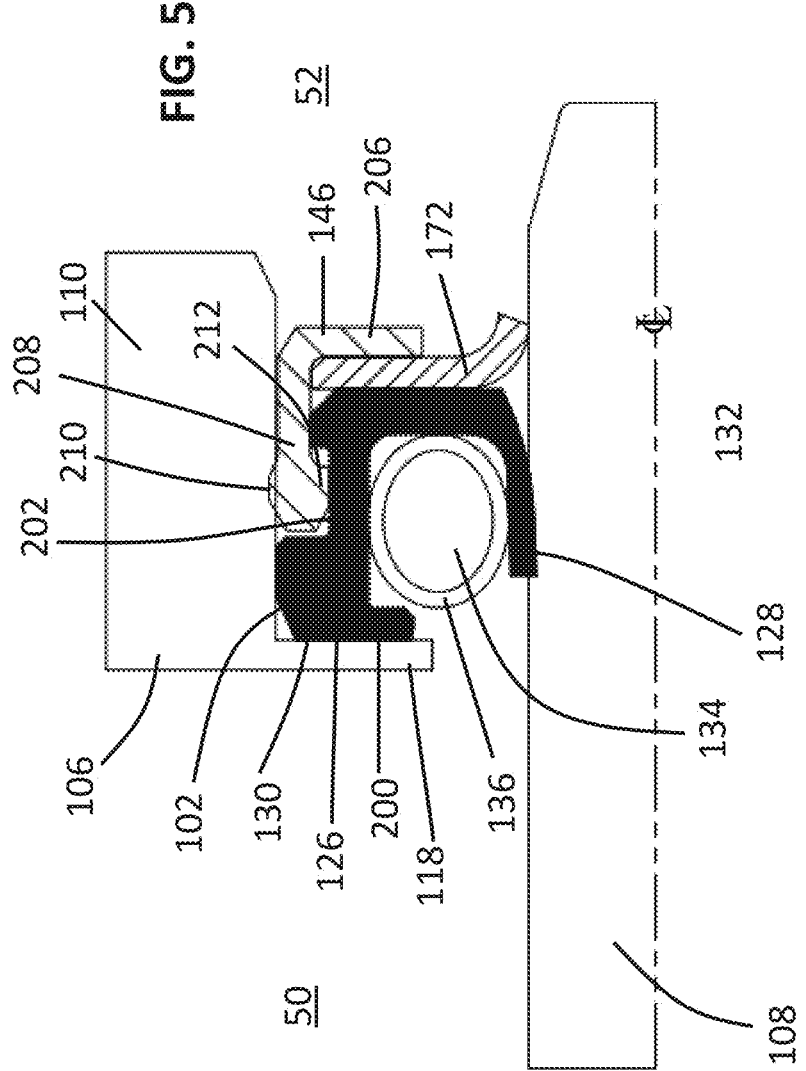
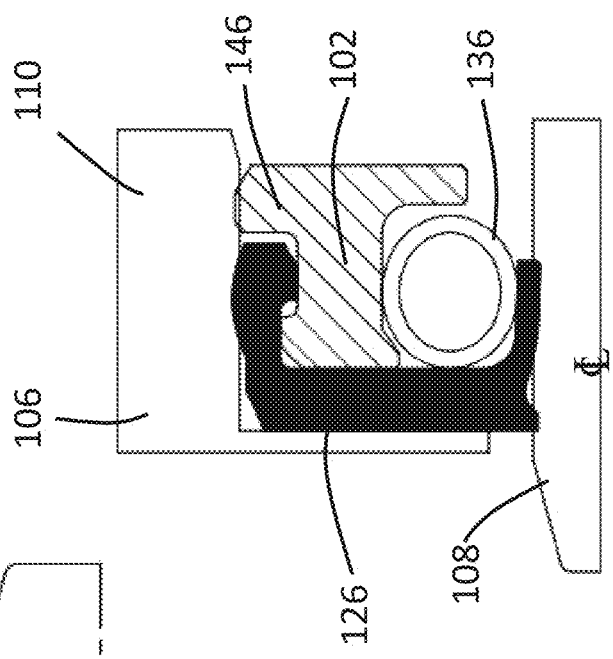
FIG. 5
FIG. 6

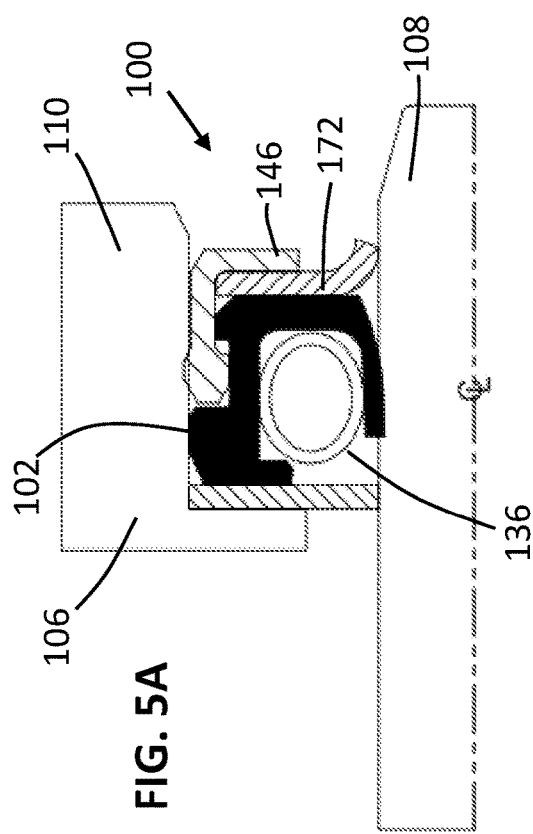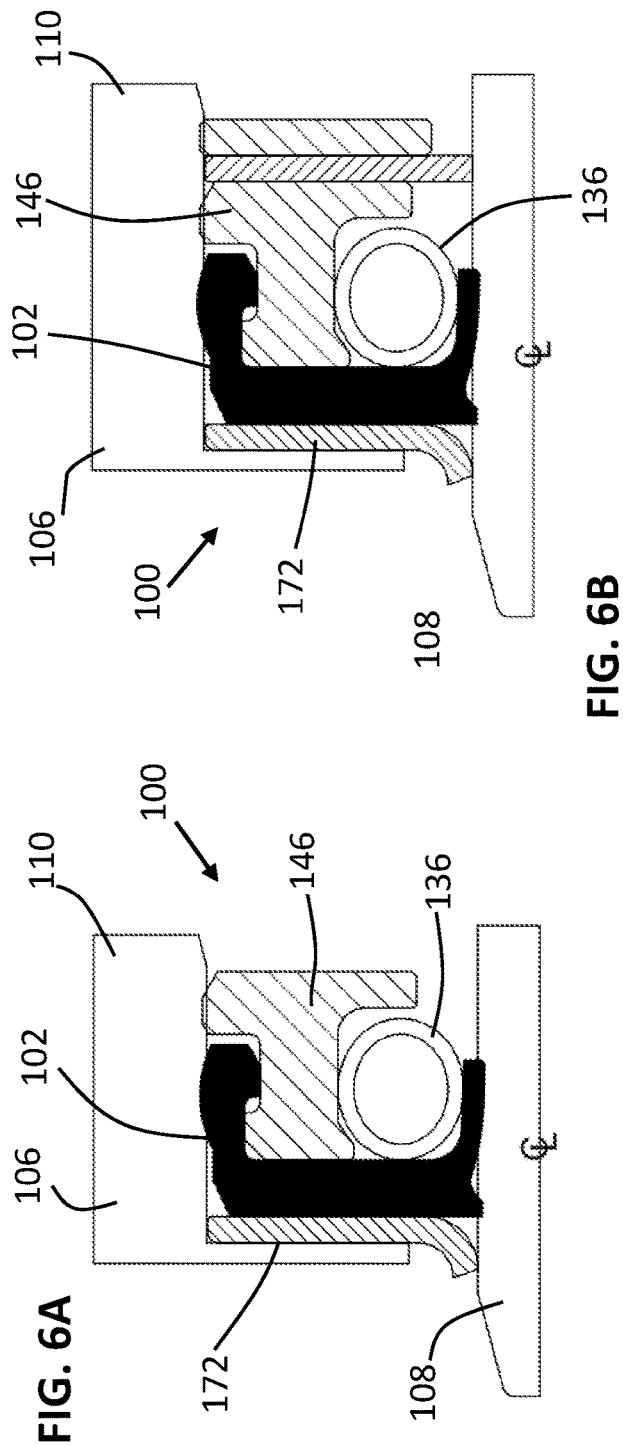

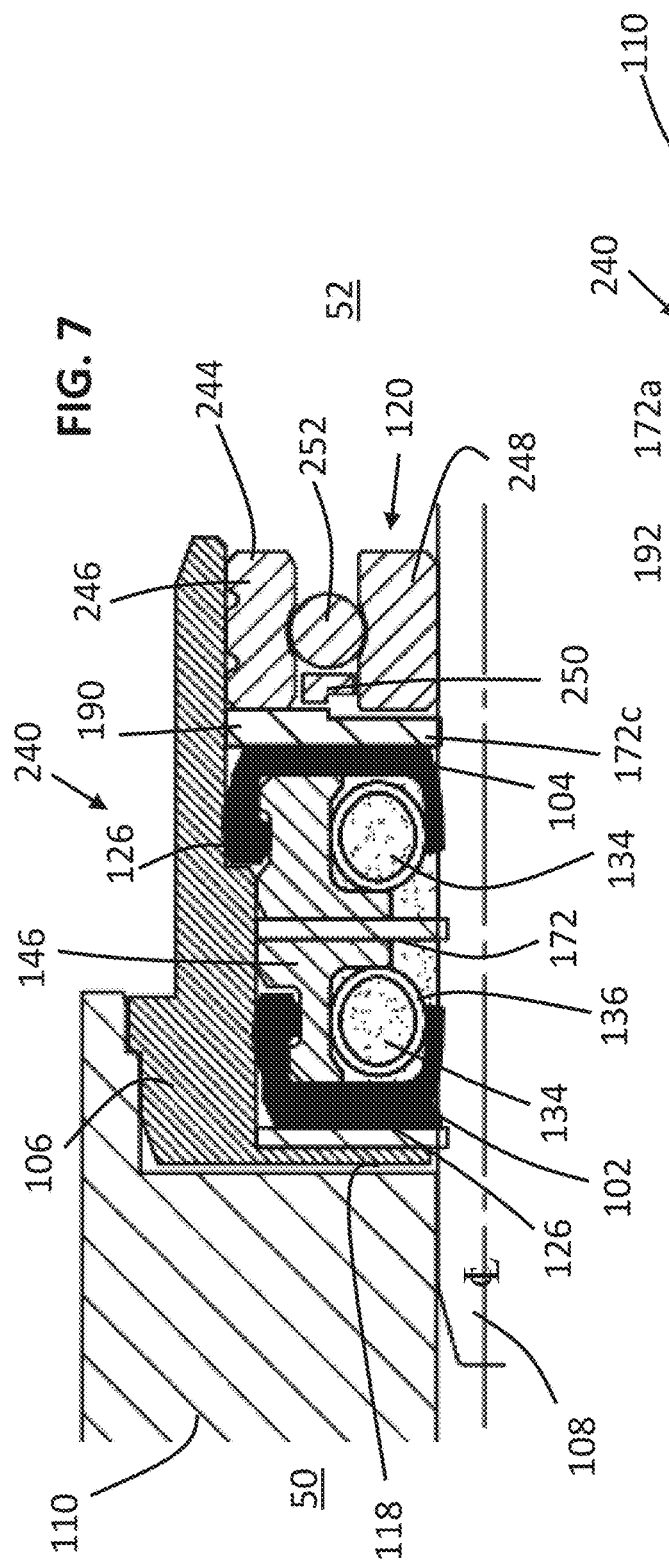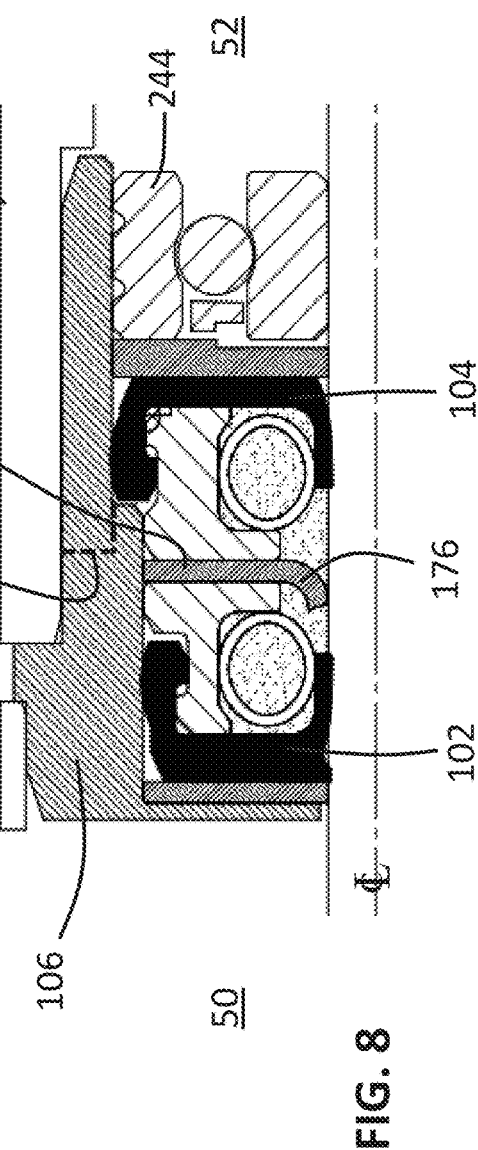

LIP SEALS AND RELATED METHODS

CROSS-REFERENCED TO RELATED APPLICATION

This is a continuation-in-part of application Ser. No. 18/051,805, filed Nov. 1, 2022; the contents of which are expressly incorporated herein by reference.

FIELD OF ART

The present disclosure is generally related to lip seals with specific discussions on spring energized lip seals and lip seals with bearing assemblies and related methods.

BACKGROUND

Bearings, such as ball bearings and roller bearings, are known for supporting an element, such as a shaft, that rotates within an outer stationary element, such as a housing. Lip seals, which can have an energizer, are known for providing a seal to flow path located between a dynamic surface and a stationary surface, such as a shaft and a housing, to prevent liquid flow from a high-pressure region to a relatively lower pressure region.

When an application uses both a seal and a bearing, the two are typically spaced or not connected to one another. Further, the seal and the bearing are typically mounted sequentially, one after the other. When used together, the seal is configured to prevent fluid, such as oil, from leaking out from the bearing box that contains the bearing and/or process fluid from leaking into the bearing box.

SUMMARY

Aspects of the invention is directed to a pre-packaged seal system and a pre-packaged seal and bearing system.

In an example, the pre-packaged seal system can comprise a cylinder having a body, an interior surface defining a bore, a retaining end having a retaining wall at one end of the bore, and an insertion end at an opposite end of the bore; a first seal assembly comprising a seal element, a locking ring, and an energizer; wherein the seal element comprising a spring cavity formed by an inside flange, an outside flange, and a center channel section and wherein part of the spring cavity is shaped by the locking ring; a second seal assembly comprising a seal element, a locking ring, and an energizer; wherein the seal element comprising a spring cavity formed by an inside flange, an outside flange, and a center channel section and wherein part of the spring cavity is shaped by the locking ring; at least one washer comprising an outside perimeter, an inside perimeter defining an opening, and a memory lip having a curved portion at the opening; and wherein the first seal assembly, the second seal assembly, and the at least one washer are located in the bore of the cylinder prior to mounting on a shaft and wherein the at least one washer is located between the first seal assembly and the second seal assembly.

The bore can have a first portion with a first inside diameter and a second portion with a second inside diameter, and wherein the second inside diameter can be larger than the first inside diameter.

The cylinder can have a first cylinder section attached to a second cylinder section along a split line.

A bearing assembly can be included with the seal system, the bearing assembly can comprise an outer ring, an inner ring, a cage retaining a plurality of rolling elements; and wherein the outer ring can be engaged are fitted to the bore of the cylinder in an interference fit.

The bore with the bearing assembly located therein can have a first portion with a first inside diameter and a second portion with a second inside diameter, and wherein the second inside diameter is larger than the first inside diameter.

The cylinder with the bearing assembly located therein can have a first cylinder section attached to a second cylinder section along a split line.

The bearing assembly can be a first bearing assembly and further comprising a second bearing assembly spaced from the first bearing assembly and the second bearing assembly can be secured to a housing and the housing can be in contact with the cylinder.

Aspects of the invention further includes a seal assembly, the seal assembly can comprise a locking ring comprising a locking flange and an inner flange extension aligned with one another along an axial position, a first deck having a notch on a first side of the inner flange and a second deck having a notch on a second side of the infer flange; a first seal element having an inside flange and an outside flange mechanically engaged to the notch of the first deck and having a first energizer biasing against the inside flange of the first seal element and an inner surface of the first deck; and a second seal element having an inside flange and an outside flange mechanically engaged to the notch of the second deck and having a second energizer biasing against the inside flange second seal element and an inner surface of the second deck.

A still further aspect of the invention includes a seal assembly comprising a seal element comprising an outside flange, an inside flange, and a center channel section connected to the inside flange and the outside flange; a washer comprising an outside perimeter, an inside perimeter defining an opening, and a memory lip having a curved portion at the opening; a locking ring comprising a first ring portion connected to a second ring portion at an intersection; wherein the second ring portion has a planar surface, a first projection on a first side of the planar surface; and a second projection on a second side of the planar surface; wherein the second projection of the second ring portion mechanically engages a notch on an outer surface of the outside flange and the center channel section and the washer are both located between the first ring portion and the second projection.

A still further aspect of the invention is a method of using pre-packaged seal systems and pre-packaged seal and bearing systems and components thereof as shown and described.

A still further aspect of the invention is a method of manufacturing or making pre-packaged seal systems and a pre-packaged seal and bearing systems and components thereof as shown and described.

The terms first and second and related generic terms, as used herein, are meant to identify components by nomenclature only and are not structurally limiting unless the context indicates otherwise.

A seal system in accordance with aspects of the invention comprises a first seal assembly 102 and a second seal assembly 104 located inside a can or cylinder. The seal system can be located inside a pump, a blower, a turbine, an actuator, or other equipment having a shaft or pin movable within a housing, such as in electronic applications, avionics, space, oil and gas, and medical applications, to name a few non-limiting examples. The seal system is understood to be generally circular and has a bore for receiving the shaft or pin, which is partially shown in the various figures of the application with a centerline C.

The exterior of the cylinder can be adjusted, such as crafted or machined, to mate with and housed within the housing of the device for the particular application. Thus, specific exterior configuration of the cylinder can be adjusted or configured, such as being sized and shaped, for installing in an equipment housing without deviating from the spirit of the present invention.

The can for retaining the two seal assemblies can have a body comprising a wall with an exterior wall surface and an interior wall surface defining a bore. The exterior wall surface can have a shoulder for mating with the equipment housing. The body can have two open ends for assembling the two seal assemblies from either end of the body. In an embodiment, a retaining wall is provided at one of the two ends of the body to define a retaining end, which prevents components of the seal system from escaping from the bore out through the retaining end. By default, the opposite end of the body is the insertion end or the assembly end for placement of seal components into the bore to form the seal system, as further discussed below.

The cylinder can be used to house seal components to form the seal system prior to assembly onto a shaft and then into a device or equipment housing. When pre-installed inside the can, the seal system may be referred to as a pre-packaged seal system. The pre-packaged seal system is thereafter ready for mounting, as a unit, onto the shaft and then the pre-packaged seal system and shaft can be installed in the requirement housing. The cylinder size, dimensions, and material can be selected for the particular application. Metal, such as stainless steel and alloys, may be used for most applications and stainless steel, cobalt chrome steels, titanium alloys, and platinum metals may be used for medical implant applications.

In an embodiment, the interior wall surface of the cylinder has a straight bore, which can be understood as having generally the same inside diameter throughout the cylinder without a purposeful step or shoulder incorporated within the bore. The entrance of the insertion end of the cylinder can be chamfered to eliminate sharp edges and facilitate insertion of seal components. Externally, the exterior wall surface of the cylinder may include chamfered surfaces, annular grooves, and/or one or more stepped surfaces to cooperate or mate with the equipment housing that the seal system is be installed into. For example, an annular groove may be on the exterior for use with an O-ring for sealing against the housing or used with a biasing spring, such as a canted coil spring, to bias against the housing.

The first seal assembly of the pre-packaged seal system can comprise a seal element comprising an inside or inner flange, an outside or outer flange, and a center channel section connecting the inner and outer flanges and defining a cavity therebetween, which can accommodate an energizer. The cavity may be referred to as a spring cavity for accommodating a biasing spring or an energizer, as further discussed below. The seal element can be non-metallic element and may be made from an elastomeric material, thermoplastic material, such as PTFE, PE or PEEK, or any other special polymers. The particular elastomer, thermoplastic or polymer, can vary depending on the application.

In an embodiment, the energizer is a canted coil spring comprising a plurality of interconnected coils all canted generally in the same direction and the coils operate to bias the inner flange away from the outer flange to press and seal against the shaft. Each of the coil of the canted coil spring can have an elliptical shape or a non-elliptical shape, such as square, rectangular, or a combination of straight edges and curved edges. In other examples, the energizer can be an O-ring or a different metallic spring type, such as a ribbon spring, a V-spring, or a helical compression or extension spring. In some examples, such as in relatively low pressure applications, the energizer can be omitted and the seal is a lip seal type but not a spring energized lip seal.

In an example, the inside flange of the sealing element has an inside diameter for placing around the shaft and a sealing lip that is pressed against the shaft surface to provide a dynamic seal, when the shaft moves or rotates. The inside diameter is preferably smaller than the shaft OD so as to create an interference fit. The sealing lip can have a long dynamic surface that is about 20% to about 75% of the length of the inside flange or a short dynamic surface that is about 5% to about 20% of the length of the inside flange. The sealing lip can be biased by the energizer against the surface of the shaft. The energizer can be a canted coil spring and can have an operating working deflection range with a generally constant biasing force over a deflection range so that forces remain exerted by the canted coil spring can be generally constant at the sealing interfaces of the seal element should the shaft move up and down.

A locking ring can be mechanically engaged to the seal element of the first seal assembly. The locking ring can have a body comprising a deck and a locking flange. The deck can comprise a notch for receiving the enlarged end section of the outer flange in a mechanical engagement, which is understood to be more than a surface to surface contact. In addition to engaging the notch, the enlarged end section of the outside flange also serves as a sealing lip to seal against the interior surface of the cylinder, which is pressed against the cylinder by the geometry of the deck and the notch.

When mechanically engaged, the seal element and the locking ring are prevented or restricted from axially separating from one another, axially along the length of the shaft. The deck can have a projection rising from the low point of the notch for supporting the inner part or the base part of the outer flange.

The deck of the locking ring has an inside surface that defines part of the spring cavity. That is, the inside surface of the deck, part of the center channel section, and the inside flange define the shape of the cavity for accommodating the energizer. The thickness of the deck can vary to change the dimension of the spring cavity, and therefore the size and/or type of energizer used to bias against the inside surface of the deck and the inside surface of the inner sealing flange.

In an example, the inside surface of the deck can be a contoured surface comprising a flat section and a tapered section, both relative to the lengthwise axis of the shaft. One or both of the flat section and the tapered section can vary in dimension and angle to vary the shape of the spring cavity for positioning the energizer therein. For example, the tapered section can be expanded or enlarged, provided with increased or decreased angle relative to the shaft axis, or can be omitted altogether to have a single flat section. The tapered section can be incorporated to preload or to turn the position of the energizer when the energizer is positioned in the spring cavity. For example, if the energizer is a canted coil spring, the tapered section can be selected to occupy portions of the spring cavity so that when the canted coil spring is situated in the spring cavity, the contour of the inside surface causes the minor axis of the canted coil spring to turn from generally horizontal relative to the shaft axis. When the minor axis is turned, the force versus deflection curve of the canted coil spring changes compared to when the minor axis is orthogonal to the shaft axis.

The locking ring can include an inner flange extension. The contoured surface of the inside surface in combination with the inner flange extension of the locking ring can cooperate to retain the energizer within the spring cavity. The inner flange extension can have a radial end tip that extends radially inwardly towards the shaft. The radial end tip projects inwardly relative to the flat section of the inner surface. The thickness of the inner flange extension can restrict or limit the energizer from translating axially within the spring cavity.

The inner flange extension can reduce the spring cavity entrance or opening to make it more difficult for the energizer to pop out of the cavity through the spring cavity entrance during use. Without the inner flange extension extending below a plane defined by the flat portion of the inside surface, the spring cavity entrance between the end tip of the inside flange and the locking ring would increase and would more readily allow the energizer to escape.

In the example shown, the radial end of the outer flange extension of the locking flange is sized to press against the interior surface of the cylinder to secure the locking ring from axial translation during service. For example, the outer flange extension of the locking ring can have an interference fit with the bore of the cylinder so that the locking ring is fixed to the cylinder via the interference fit. As the seal element is mechanically engaged to the locking ring, the seal element is also secured from axial translation during service. Further, the bump or enlarged section on the outside flange can be pressed between the notch on the deck and the interior surface of the cylinder, the enlarged section functions as a sealing lip to form a static seal at the outside flange that prevents fluid from flowing thereacross.

In an example, an excluder is provided at an end of the center channel section, on the inside flange side. As another way to view it, an excluder can be provided at an end of the inside flange, opposite the free end of the inside flange. The excluder can be singularly formed with the body the seal element and can be provided with an inside diameter (ID) that is smaller than the inside diameter of the inside flange at the inside sealing lip.

The excluder can have a fin-like cross-section with a flat or blunt tip that seals against the shaft located adjacent an annular recess. The annular recess presents a discontinuity along the inside of the sealing flange. In other words, the inside flange can be separated from the excluder by the annular recess. The tight fitting excluder around the outside diameter (OD) of the shaft can help to prevent fluid located external of the spring cavity from entering past the excluder and into the interface between the shaft and the inside flange and possibly interferes with the dynamic seal or presents a difficult media for the seal to maintain.

The second seal assembly of the pre-packaged seal system can be the same or similar to the first seal assembly. For example, the second seal assembly can have a seal element, a locking ring, and an energizer that are the same or similar to analogous components of the first seal assembly. However, in the present embodiment, the tips or free ends of the inner and outer sealing flanges of the seal element of the second seal assembly can face the seal element of the first seal assembly, i.e., the two seal assemblies face one another. In other examples, the seal system can be arranged so that the first and second seal assemblies face away from the pressure side (e.g., high pressure is from the left side and both seal assemblies face the right side) or both seal assemblies face the pressure side. Less preferably, both seal assemblies face away from one another.

In yet another example, rather than being housing mounted wherein the outer sealing flanges of the two sealing assemblies are static against the interior surface of the cylinder, the sealing assemblies can instead be piston mounted. In a piston mounted configuration, the sealing flange that seals against the outside diameter (OD) of the shaft is static with the shaft and the sealing flange that seals against the interior surface of the cylinder is in dynamic sealing arrangement with the cylinder. The piston mounted seal system may also have the first and second seal assemblies arranged to face one another, both facing the pressure region, both facing away from the pressure region, or both facing one another.

In an example, the two locking rings of the two seal assemblies of the pre-packaged seal system contact one another at the parting line between them. Preferably, a washer is provided between the two seal assemblies to space the two locking rings. The washer located between the two seal assemblies can be referred to as a first washer as additional washers may be incorporated with the seal system. The washer can be made from an elastomeric material, thermoplastic material, such as PTFE, PE or PEEK, or any other special polymers; and can be incorporated in a primary seal and secondary seal configuration.

The first washer may have the same non-metallic material as the sealing elements or be different. In an example, the seal system seals against two exterior or external environments, external to the spring cavities of the first and second seal assemblies. Assuming region is a high pressure region and the first seal assembly has failed thereby allowing fluid to enter the spring cavity of the first seal assembly from the high pressure region, the first washer helps to prevent fluid intruding or seeping into the spring cavity of the first seal assembly to then migrate or seep into the spring cavity of the second seal assembly. Thus, the second seal assembly can continue to provide a seal despite failure of the first seal assembly due to the presence of the first washer, which can have a memory lip that functions as a lip seal, as further discussed below.

In an example, the first washer has a planar body having a first surface and an opposing second surface. The first washer is wedged or positioned between the two seal assemblies, such as between the two locking rings. A memory lip extends from the planar body and has a curved portion. The memory lip may be molded along with the planar body to have the curved portion. The curved portion of the memory lip is curved or arcuate such that the second surface functions as a lip seal and contracts the OD of the shaft to seal against the shaft while the first surface is spaced away or does not contact the shaft. When the washer is provided with the memory lip that functions as a lip seal to seal against the shaft, the washer may be referred to as a lip seal. The lip seal of the first washer provides another dynamic seal for the seal system, which in combination with the first and second seal assemblies provide three dynamic sealing points or three dynamic seals with the shaft.

The memory lip defines an inside opening of the washer, inwardly of the washer's outer perimeter. The inside opening, or just opening for short, has a diameter that is smaller than the OD of the shaft so as to be in interference with the shaft. Preferably, the inside diameter of the opening is the same as or smaller than the inside diameter of the inside flange so as to have a higher inference than the inside flange. The washer can be configured to orient so that the opening, such as the end edge between the two surfaces, faces the high pressure region. Thus, the pocket immediately behind the opening of the memory lip is oriented away from the media that the washer is to seal against, thereby avoiding the possibility of a material buildup at the pocket.

In an example, another washer can be provided adjacent the seal element of the first seal assembly. This washer can be referred to as a second washer and can be the same or similar to the first washer. The second washer can have a memory lip that functions as a lip seal and an opening that faces away from the first seal assembly, facing the external region. Thus, if the external region is the high pressure region, incorporating the second washer in addition to the excluder will help to reduce or eliminate fluid seepage into the sealing interface between the shaft and the inside flange of the first seal assembly. The lip seal of the second washer provides another dynamic seal for the seal system, which in combination with the first washer and the first and second seal assemblies can provide four dynamic sealing points or four dynamic seals with the shaft.

Further, by arranging the second washer to orientate the same way as the first washer, the memory lip of the second washer can be orientated to seal against external fluid that may leak into the spring cavity of the first seal assembly and the memory lip of the first washer is orientated to seal against external fluid that may leak into the spring cavity of the second seal assembly should the first seal assembly fails.

The seal system may further include a washer located adjacent the seal element of the second seal assembly. This washer may be referred to as a third washer incorporated with the seal system. The third washer can be the same or similar to the first washer. The third washer can have a memory lip that functions as a lip seal and an opening that faces away from the second seal assembly, facing the opposite external region. Thus, if the opposite external region is a high pressure region relative to the spring cavity of the second seal assembly, incorporating the third washer with the lip seal can help to reduce or eliminate fluid seepage into the sealing interface between the shaft and the inside flange of the second seal assembly from the external region. The lip seal of the third washer can provide another dynamic seal for the seal system, which in combination with the first washer, the second washer, and the first and second seal assemblies can provide five dynamic sealing points or five dynamic seals with the shaft.

In yet another example, the seal element of the second seal assembly may incorporate an excluder, similar to that of the first seal assembly. In still another example, the three washers may be omitted and the seal system may be practiced simply with each of the two seal elements of the two seal assemblies having an excluder.

A retaining disc can be provided at the insertion end of the cylinder to retain the various components therein following assembly. The retaining disc can comprise an outer diameter and an inner diameter. The outer diameter of the retaining disc can be selected to form an interference fit with inside diameter of the cylinder, such as about 0.1 thousandths to about 5 thousandths total clearance, and can be welded at the interference point with the cylinder.

The inside diameter of the retaining disc can have a dimension that is visually larger than the shaft OD to not interfere or rub against the shaft OD during assembly and use. The space of the body of the retaining disc between the ID and the OD should be sufficiently large to retain the various sealing components inside the cylinder without interfering with the movement of the shaft. The retaining disc may be made from a metal material or a polymeric material with the specific material to select from depending on the application of the seal system.

Service grease may be packed inside the spring cavity of the first seal assembly and/or the spring cavity of the second seal assembly. The type of service grease can be selected for the particular seal application. For example, if the application is for an implantable medical device, then the service grease can be a biocompatible grease, such as perfluoropolyether (PFPE) based oils and thickeners. For other non-medical applications, the grease can be a lubricant grease, such as calcium grease, lithium grease, sodium grease, etc. When incorporating service grease into one of both spring cavities, the grease not only provides lubrication for the dynamic interfaces between the movable shaft and the inside flanges, but the presence of the grease displaces voids and pockets inside the spring cavities, which helps to prevent external fluid from entering the same space that is already occupied by the grease.

An alternative seal system provided in accordance with further aspects of the invention can be similar as the pre-packaged seal system of the first embodiment with a few exceptions. In an exemplary alternative embodiment, the exterior of the cylinder can be modified with an extended recess to form a shoulder for assembly with the equipment housing. The shoulder can be located further away from the insertion end of the cylinder than the shoulder of the first embodiment. In the present embodiment, the interior surface of the cylinder can be modified to have two different interior surface sections defining two different bore sections. The first bore section can be sized with a first inside diameter (ID) and the second bore section can be sized with a second ID, which is larger than the first ID.

In the present embodiment, the first and second seal assemblies can be similar to the seal assemblies of the first embodiment, except for their relative sizes. Whereas the OD of the first and second seal elements of the first embodiment are generally the same for fitting into the cylinder with a single ID bore, the seal element of the second seal assembly of the present embodiment has a larger OD than the seal element of the first seal assembly. The different sized ODs can be used to seal against two different bore sections of the cylinder of different sizes.

The cylinder with different bore sections and the seal elements with different ODs of the present embodiment can facilitate assembly of the seal system. For example, when installing the first seal assembly into the bore of the cylinder, the locking ring must be forced or pressed into the bore due to the interference fit between the locking flange and the first bore section. By sizing the cylinder to have two different bore sections, the locking ring of the second seal assembly is pressed or forced to only slide a minimal distance into the first bore section for installation and not rub or contact the second bore section during assembly. Thus, installation or assembly of the second seal assembly can be simplified by the stepped bore of the present embodiment compared to the straight cylinder bore of other embodiments.

To accommodate the seal element of the second seal assembly to seal against the second bore section of the cylinder, the deck of the locking ring of the alternative embodiment is increased in thickness and diameter. In an example, the notch for mechanically engaging the outside flange and the support surface adjacent the notch has been displaced radially outwardly relative to the central axis to press the outside sealing lip of the outside flange against the larger bore section. In the present embodiment, the inside surface of the locking ring of the second seal assembly can be the same or similar to that of the first seal assembly so that similar energizers may be used for both seal assemblies. However, the inside surface of the second seal assembly may be adjusted so that two different energizers can be used with two different sized spring cavities, such as to provide two different sealing forces.

In an example, three washers can be incorporated with the alternative seal system. While all three washers may each include a memory lip that functions as a sealing lip as previously discussed, in the present embodiment, the second washer and the third washer can be standard washers, which is understood as being generally planar and having an outer perimeter and an inner perimeter defining an inside opening, without a memory lip.

In an example, the inside openings of the second and third washers are sized to have approximately a size-on-size fit with the shaft OD. The size-on-size fit can sufficiently deter viscous fluid from entering into the interface between the shaft and the inside flange and possibly interferes with the dynamic seal or presents a difficult media for the seal to maintain. In other embodiments, the standard washers can be sized with an inside opening with a size-on size fit or slight interference fit with the shaft OD, in the order of about 0.1 to 2 thousandths.

In the present embodiment, the retainer disc can be sized to engage the larger second bore section. For example, the outside diameter of the retainer disc can be sized to have an interference fit with the second bore section to retain the various components within the bore.

Another alternative seal system is similar to the first two seal systems with a few exceptions. In the present embodiment, the cylinder has generally the same inside diameter but is a split cylinder and comprises a first cylinder section and a second cylinder section. The split cylinder has a stepped split line wherein one of the two cylinder sections has an opening with an inside diameter for receiving a projection of the other cylinder to assemble the two cylinder sections together. In an example, the opening with the inside diameter and the projection with an outside diameter are sized with an interference fit, to prevent unwanted separation. Although the second cylinder section is shown with the opening and the first cylinder section is shown with a projection, the two can reverse.

Each cylinder section can have an open end or insertion end and a closed end with a retaining wall. The first seal assembly can be inserted into the first cylinder section through the insertion end and retained at the opposite end by the retaining wall. Similarly, the second seal assembly can be inserted into the second cylinder section through the insertion end of the second cylinder section and retained at the opposite end by the retaining wall. Both retaining walls can have inside diameters that are sufficiently large so as to not rub or contact the shaft OD during installation and use.

Three gaskets may be incorporated with the present alternative seal system. In the present embodiment, the three gaskets can each comprise a memory lip. Alternatively, the gaskets can be mixed with both a standard gasket and one with a memory lip. In an example, the first and the second gaskets can both be provided with memory lips to function as sealing lips and the third gasket can be a standard gasket. The first gasket may be positioned within the first cylinder section or the second cylinder section of the split cylinder. In an example, the first gasket is positioned inside the bore of the first cylinder section with the outside diameter of the gasket pressed against the inside diameter of the first bore section. Further, the first gasket can be sized with a thickness that gets compressed between the two locking rings of the two seal assemblies when the seal system is fully assembled as shown.

In yet another embodiment, the seal system can omit the cylinder and be assembled directly into the housing without the cylinder. Optionally, the alternative assembly can also be pre-packaged inside a cylinder.

The present alternative seal system can comprise a first seal assembly and a second seal assembly each with a seal element having generally the same ID and OD and arranged to face one another. However, in the present embodiment, the locking ring is a combination locking ring. That is, the combination locking ring has a single locking flange for locking against the interior of the cylinder or housing but has two different decks with each comprising a notch for mechanically engaging the respective outside flange of the respective seal element.

The two decks of the combination locking ring can be located to either side of the locking flange. The combination locking ring can also have a single inner flange extension. The locking flange and the inner flange extension can align generally along the same axial position relative to the shaft and the two decks can be located on either side of this aligned structure. The length of the single inner flange extension can be selected to adjust the spring cavity opening of both the first and second seal assemblies as desired, to restrict the two energizers from escaping out through the respective spring cavity opening during use.

In yet another alternative seal system, a seal assembly has a seal element, a locking ring, a washer, and an energizer located in the spring cavity. The seal assembly may be mounted directly in a gland of a housing to seal against the housing and the dynamic shaft without a cylinder or a can. In an example, the seal assembly of the present alternative embodiment may be pre-mounted in a cylinder. The seal system can further be provided with a washer having a memory lip that functions as a sealing lip, as previously discussed. Thus, the present seal system is understood as a double seal assembly with two dynamic seals or two dynamic sealing points. One of the two sealing lips can seal against the shaft without being biased by a spring.

The seal element has an inside flange, an outside flange, and a center channel section that together define a spring cavity. An energizer, which can be a canted coil spring, can be located in the spring cavity and biases the inside and outside flanges away from one another. The spring cavity can be formed without a locking ring and the shape of the spring cavity can be defined by the inside flange, the outside flange, and the center channel section only, without the locking ring. The enlarged end section of the outer flange can be sized with an OD that presses against the interior of the housing or cylinder to seal thereagainst.

A retaining lip can extend radially inwardly from an end of the outside flange towards the shaft axis or central axis of the seal assembly to reduce the spring cavity opening. The retaining lip can be singularly formed with the seal element and the length of the retaining lip can be selected to minimize the spring cavity opening.

A notch can be provided on the exterior of the outside flange to mechanically engage the projection on the locking ring, which can be sized with an OD to form an interference fit with the housing or cylinder. In the assembled configuration, both the enlarged end section of the outside flange and the locking ring can contact the interior of the housing or cylinder.

The locking ring of the present embodiment can comprise first flange section attached to a second flange section at an intersection. In the example shown, the first flange section can be generally planar and extends transversely to the shaft. The first flange section can function as a retaining disc to secure the various seal components within the cavity of the housing or cylinder, similar to the retaining disc discussed elsewhere.

The second flange section can extend in the axial direction relative to the shaft. In the example shown, the flange section can have an end projection on an outside surface to define an OD that is larger than the remaining OD part of the second flange. The outside projection can provide an interference with the inside surface of the cylinder or housing. In some example, the projection can be located closer to the intersection of the two flange sections than at the opposite end of the second flange section.

Interiorly, the second flange section of the locking ring has a projection on the inside surface for mechanically engaging the notch of the outside flange of the sealing element. A space or gap is provided between the vertical lip of the inside projection and the wall of the first flange section. The gap can be sized and shaped to accommodate the width of the center channel section and the washer to retain the two therebetween during assembly and service.

The washer can have a memory lip that functions as a sealing lip, as previously discussed. In the present embodiment, the memory lip can be orientated to face the outside region while the free end of the inside flange of the seal element is oriented to face the outside region. In an example, a second washer may be incorporated between the retaining wall and the seal element. The second washer can be a standard washer or one with a memory lip. Adding the second washer can allow the use of service grease in the spring cavity.

A seal system in accordance with further aspects of the invention can comprise a seal assembly mounted directly in the gland of a housing. Alternatively, the housing can be a cylinder and the seal assembly can be mounted to the cylinder as a pre-packaged seal system before being mounted inside the gland of the housing. The present seal assembly can comprise a seal element, a locking ring, a washer, and an energizer located in a spring cavity.

The present seal assembly can be similar to the first seal assembly. The present seal assembly may be used as a single seal to prevent higher interior fluid pressure from leaking outside, or to seal higher environmental pressure from leaking inside into the lower pressure spring cavity. In some examples, a washer may be placed in abutting contact with the locking ring. A retainer disc may be placed adjacent the washer to retain the washer against the locking ring. The washer can be a standard washer or one with a memory lip. Adding a washer can allow the use of service grease in the spring cavity of the seal assembly.

A further aspect of the invention includes a seal bearing system. The seal bearing system shares many aspects as the seal system discussed elsewhere herein. In an example, the seal bearing system comprises a cylinder with a retaining wall and an open end or insertion end for mounting the various seal bearing components. Exteriorly, the cylinder may be shaped with shoulders, flanges, etc. for mating with equipment housing, which can be any number of devices, such as a pump, a mixer, a valve, a blower, etc. having a shaft movable within the housing.

Internally, the cylinder can have a stepped bore with a first bore section and a second bore section, similar to other split cylinders discussed elsewhere herein. A first seal assembly, a second seal assembly, and two washers can be located inside the bore, also similar to the seal system discussed elsewhere herein. The first and second washers can be of a standard type with a straight inside opening without a memory lip. The inside opening of the standard washers can be smaller than the shaft OD to generate an interference fit. In other examples, the two washers can each have a memory lip, or only one of the two can have a memory lip, the one between the two locking rings or the one adjacent the retaining wall. Further, while the two seal elements face one another, they can be oriented to both face the exterior region, be oriented to both face the exterior region, or oriented to face away from one another.

A retaining disc can be placed in abutting contact with the seal element of the second seal assembly. The retaining disc can have an interference fit with the cylinder and incorporated to retain the various seal components inside the bore. In an alternative embodiment, a washer is placed in abutting contact with the seal element of the second seal assembly instead of or in addition to the retaining disc. The washer can be a standard washer having an inside opening with a size-on-size fit with the shaft OD. The washer can be thicker than the first and second washers to separate the second seal assembly from the bearing assembly.

In an example, the bearing assembly of the seal bearing system can comprise an outer ring, an inner ring, and a cage for retaining a plurality of rolling elements in retaining sockets. The various components of the bearing assembly are typically made from a metal material, which can all be the same material or more likely from a variety of different metal materials. The inner ring can be configured to tightly fit around the exterior of the shaft and rotate with the shaft along with the rolling elements, which can be held by the cage as they rotate with the shaft in spaced apart relationship. The inner ring can have an inside diameter configured to fit around the shaft in an interference fit and an outer diameter, relative to the inside diameter, defining a thickness therebetween. The inner ring can have a width and be sized and shaped to accommodate selected rolling elements.

The outer ring can be tightly fitted against the interior surface of the cylinder and held stationary to the cylinder when the inner ring, the cage, and the rolling elements rotate with the shaft. The outer ring can have an inside diameter configured to contact the rolling elements and an outer diameter configured to fit against the interior of the cylinder in an interference fit. The inside diameter and the outside diameter of the outer ring define a thickness therebetween. The outer ring has a width and is sized and shaped to accommodate selected rolling element types.

In an example, the bearing assembly is a ball bearing assembly and the rolling elements are metal balls or spherical balls. When the bearing assembly is a ball bearing assembly, the outer and inner rings can comprise inner and outer bearing races for the plurality of balls to contact and rotate against. In other examples, the bearing assembly can be a different bearing type, such as a roller bearing assembly, a tapered or angled roller bearing assembly, a thrust ball bearing assembly or a roller bearing assembly, etc. Rolling elements of a roller bearing assembly and tapered roller bearing assembly can embody solid rotating cylinders or solid tapered cylinders.

As shown, the outer ring comprises two exterior grooves defining three raised projections. In other examples, one or more than two exterior grooves and two or more than three raised projections can be incorporated. Further, for each projection, relatively smaller grooves, such as microgrooves, can be provided on the exterior thereof to facilitate assembly of the outer ring into the bore of the cylinder. The grooves, when incorporated, reduce interference and friction and facilitate assembly.

The bearing assembly, the seal assemblies, and the washers can be assembled to the cylinder in a pre-packaged configuration to form a seal bearing system in accordance with aspects of the invention. The pre-packaged seal and bearing assembly is thereafter ready for mounting, as a unit, onto the shaft. The assembly can then be installed into the housing.

Service grease, as discussed above, may be incorporated in the spring cavities of one or both seal assemblies of the seal bearing system. The same or different service grease may be used with the bearing assembly to provide lubrication for the rolling elements.

An alternative seal bearing system can be similar to the seal bearing system discussed elsewhere herein. The pre-packaged seal and bearing system of the alternative embodiment can have a split cylinder to facilitate installation of the seal assemblies, washers, and bearing assembly, similar to the split cylinder discussed elsewhere herein. A first washer with a memory lip can also be incorporated with the present seal and bearing system instead of a standard washer between the two seal assemblies.

The pre-packaged seal and bearing system can be mounted to a housing having an additional bearing assembly. The seal and bearing system can be engaged to or installed within a housing, which can have more than one housing sections. For example, the pre-packaged seal and bearing system can first be mounted onto a shaft and then the combination mounted to the housing.

In an example, a second bearing assembly can be mounted to the housing and shaft and spaced from the first bearing assembly of the pre-packaged seal and bearing system. This configuration shows how the pre-packaged seal and bearing system may be used in a device in which a gap between the first and second bearing assemblies, called a device chamber, can be used to house any number of device components, such as a rotor of a motor, a stator of a motor, an oil sump, valve packing materials, fan blades, etc. Having the bearing assemblies located on either end of the device chamber provides support and stability when the shaft rotates. The pre-packaged seal and bearing system provides a single sealing solution with multiple components that can be adapted for multiple applications. For example, the seal assemblies can be orientated with different configurations, either facing one another, both facing the high pressure region, etc., for different applications. The pre-packaged seal and bearing system can also be modified to have different gaskets for added sealing points, such as by utilizing one or more gaskets with memory lips that serve as sealing lips. The cylinder can also have a straight bore, a stepped bore, and can include a split cylinder to facilitate assembly.

Still further, service grease may be included in the spring cavities to occupy the spring cavities so that external fluid is less prone to enter into the same space. The service grease can be selected to be compatible with the particular application. For example, if the housing is part of a medical implantable device, the service grease must be biocompatible.

In yet another example, the pre-packaged assembly is a pre-packaged seal system without a bearing assembly. The bearing assembly can instead be mounted outside of or external to the cylinder of the pre-packaged seal system.

A still further aspect of the invention is a method of using seal assemblies, seal systems, pre-packaged seal systems, and pre-packaged seal and bearing assemblies as shown and described.

A still further aspect of the invention is a method of manufacturing or making seal assemblies, seal systems, pre-packaged seal systems, and pre-packaged seal and bearing assemblies as shown and described.

The various seal assemblies, gaskets, pre-packaged seal systems, and pre-packaged seal and bearing systems can be interchangeable unless the components are mechanically or operationally conflicting. For example, the cylinder of FIG. 7 may be replaced with the split cylinder of FIG. 8, and the washers of FIG. 7 may be replaced with the washers with memory lips of FIG. 1A. Thus, the various embodiments described herein are intended to be interchangeable where they are compatible to do so.

BRIEF DESCRIPTION OF THE DRAWINGS

These and other features and advantages of the present devices, systems, and methods will become appreciated as the same becomes better understood with reference to the specification, claims and appended drawings wherein:

FIG. 1A is cross-sectional side view of a seal system in a pre-packaged assembly in accordance with aspects of the invention and FIG. 1B is an enlarged view of the first seal assembly of the seal system.

FIG. 2 is cross-sectional side view of a seal system in a pre-packaged assembly and in which the cylinder has a stepped bore.

FIG. 3 is cross-sectional side view of a seal system in a pre-packaged assembly and in which the cylinder has a split bore.

FIG. 4 is cross-sectional side view of a seal assembly having a dual locking ring engaging two spaced apart sealing elements.

FIG. 5 is cross-sectional side view of a seal assembly having a ring engaging two lip seals in a back-to-back configuration and FIG. 5A shows the seal assembly with a second sealing washer.

FIG. 6 is a cross-section side view of a seal assembly having a seal element, a locking ring, and an energizer; FIG. 6A shows the seal assembly with a first sealing washer; and FIG. 6B shows the seal assembly with the first sealing washer and a second sealing washer.

FIG. 7 is cross-sectional side view of a seal and bearing system in a pre-packaged assembly in accordance with aspects of the invention.

FIG. 8 is cross-sectional side view of a seal and bearing system in a pre-packaged assembly in accordance with aspects of the invention in which the cylinder is a split cylinder.

DETAILED DESCRIPTION

Figure 9:
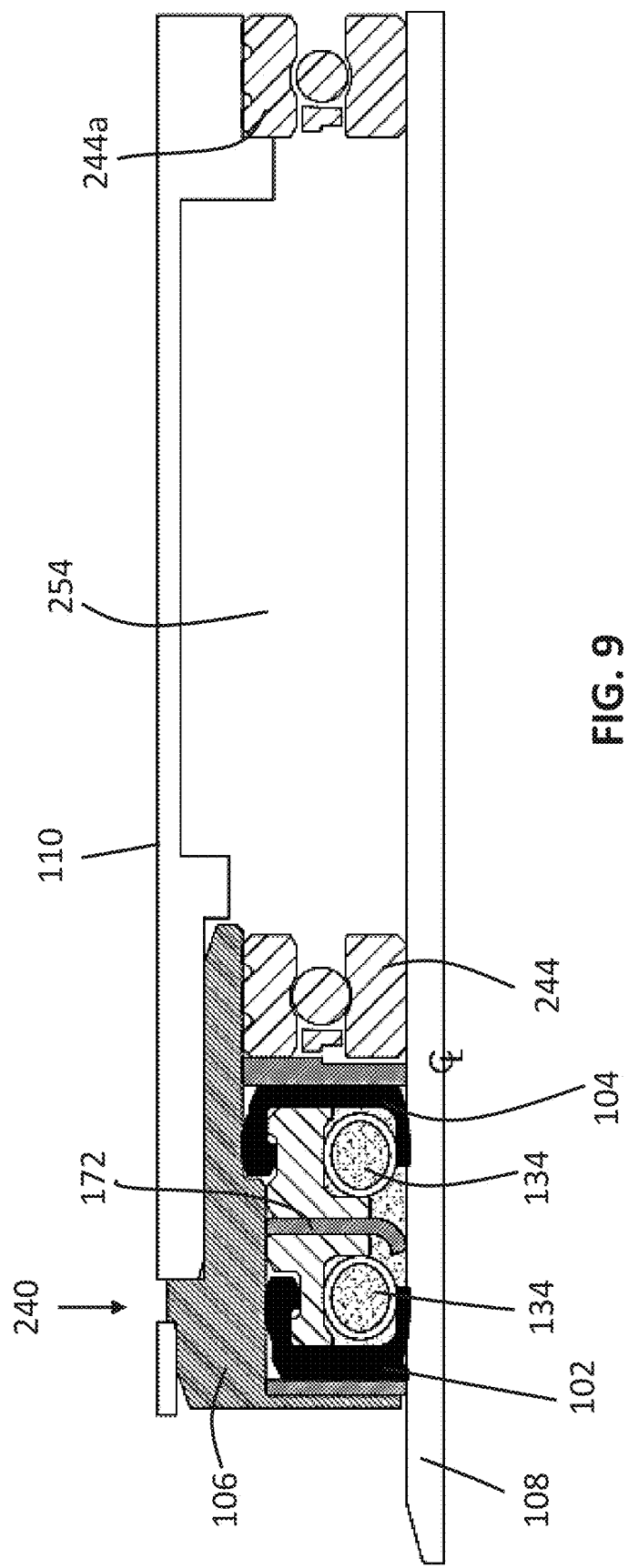
FIG. 9 is cross-sectional side view of the seal and bearing system of FIG. 8 assembled to a housing and spaced from a second bearing assembly.

The detailed description set forth below in connection with the appended drawings is intended as a description of the presently preferred embodiments of lips seals and bearing assemblies provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

With reference now to FIG. 1A, a seal system 100 comprising a first seal assembly 102 and a second seal assembly 104 is shown located inside a can or cylinder 106. The terms first and second and related generic terms, as used herein, are meant to identify components by nomenclature only and are not structurally limiting unless the context indicates otherwise. The seal system 100 can be located inside a pump, a blower, a turbine, an actuator, or other equipment having a shaft or pin 108 movable within a housing 110, such as in electronic applications, avionics, space, oil and gas, and medical applications, to name a few non-limiting examples. The seal system 100 is understood to be generally circular and has a bore for receiving the shaft or pin 108, which is partially shown about a centerline L. The exterior of the cylinder 106 can be adjusted, such as crafted or machined, to mate with and housed within the housing 110 of the particular application. Thus, specific exterior configuration can be adjusted or configured, such as being sized and shaped, without deviating from the spirit of the present invention.

The can 106 for retaining the two seal assemblies 102, 104 can have a body 112 comprising a wall with an exterior wall surface 113 and an interior wall surface 114 defining a bore 116. The exterior wall surface 113 is shown with a shoulder 113a for mating with the housing 110. The body 112 can have two open ends for assembling the two seal assemblies 102, 104 from either end of the body. In the present embodiment, a retaining wall 118 is provided at one of the two ends of the body 112 to define a retaining end, which prevents components of the seal system 100 from escaping from the bore 116 out through the retaining end. By default, the opposite end of the body 112 is the insertion end or the assembly end 120, for placement of seal components into the bore 116 to form the seal system 100, as further discussed below.

The cylinder 106 can be used to house seal components to form the seal system 100 prior to assembly onto a shaft 108 and then into a device or equipment housing. When pre-installed inside the can 106, the seal system 100 may be referred to as a pre-packaged seal system. The pre-packaged seal system is thereafter ready for mounting, as a unit, onto the shaft. The cylinder size, dimensions, and material can be selected for the particular application. Metal, such as stainless steel and alloys, may be used for most applications and stainless steel, cobalt chrome steels, titanium alloys, and platinum metals may be used for medical implant applications.

In the present embodiment, the interior wall surface 114 of the cylinder has a straight bore 116, which can be understood as having generally the same inside diameter throughout the cylinder without a purposeful step, unlike the cylinder of FIG. 2 with a stepped wall. However, the entrance of the insertion end 120 can be chamfered to eliminate sharp edges and facilitate insertion of seal components. Externally, the exterior wall surface 113 may include chamfered surfaces, annular grooves, and/or one or more stepped surfaces to cooperate or mate with the equipment housing that the seal system 100 is be installed into. For example, an annular groove may be on the exterior for use with an O-ring for sealing against the housing or used with a biasing spring, such as a canted coil spring, to bias against the housing.

The first seal assembly 102 comprises a seal element 126 comprising an inside or inner flange 128, an outside or outer flange 130, and a center channel section 132 connecting the inner and outer flanges and defining a cavity 134 therebetween, which can accommodate an energizer 136. The cavity 134 may be referred to as a spring cavity for accommodating a biasing spring, as further discussed below. With further reference to FIG. 1B, which is an enlarged view of the first seal assembly 102, the seal element 126 is non-metallic and may be made from an elastomeric material, thermoplastic material, such as PTFE, PE or PEEK, or any other special polymers. The particular elastomer, thermoplastic or polymer, can vary depending on the application. In the embodiment shown, the energizer 136 is a canted coil spring comprising a plurality of interconnected coils all canted generally in the same direction and the coils operate to bias the inner flange 128 away from the outer flange 130 to press and seal against the shaft 108. In other examples, the energizer 136 can be an O-ring or a different metallic spring type, such as a ribbon spring, a V-spring, or a helical compression or extension spring. In some examples, such as in relatively low pressure applications, the energizer can be omitted and the seal is a lip seal type but not a spring energized lip seal.

As shown, the inside flange 128 of the sealing element 126 has an inside diameter for placing around the shaft 108 and a sealing lip 140 that is pressed against the shaft surface to provide a dynamic seal, when the shaft moves or rotates. The inside diameter is preferably smaller than the shaft OD so as to create an interference fit. The sealing lip 140 can have a long dynamic surface that is about 20% to about 75% of the length of the inside flange 128 or a short dynamic surface that is about 5% to about 20% of the length of the inside flange. The sealing lip 140 can be biased by the energizer 136 against the surface of the shaft 108. As shown, the energizer 136 is a canted coil spring, which has an operating working deflection range and provides a generally constant biasing force over a deflection range so that forces remain generally constant at the sealing interfaces should the shaft moves up and down.

A locking ring 146 is mechanically engaged to the seal element 126 of the first seal assembly 102. The locking ring 146 has a body 148 comprising a deck 150 and a locking flange 152. The deck 150 comprises a notch for receiving the enlarged end section 129 of the outer flange 130 in a mechanical engagement, which is understood to be more than a surface to surface contact. In addition to engaging the notch, the enlarged end section 129 of the outside flange 130 also serves as a sealing lip to seal against the interior surface of the cylinder 106, which is pressed against the cylinder by the geometry of the deck and the notch. When mechanically engaged, the seal element 126 and the locking ring 146 are prevented or restricted from axially separating from one another, axially along the length of the shaft. The deck has a projection rising from the low point of the notch for supporting the inner part or the base part of the outer flange 130. The deck 150 further has an inside surface 154 that defines part of the spring cavity 134. The thickness of the deck 150 can vary to change the dimension of the spring cavity 134, and therefore the size and/or type of energizer 136 used to bias against the inside surface of the deck 150 and the inside surface of the inner sealing flange 128.

In the example shown, the inside surface 154 of the deck 150 is a contoured surface comprising a flat section and a tapered section, both relative to the lengthwise axis of the shaft. One or both of the flat section and the tapered section can vary in dimension and angle to vary the shape of the spring cavity 134 for positioning the energizer 136 therein. For example, the tapered section can be expanded or enlarged, provided with increased or decreased angle relative to the shaft axis, or can be omitted altogether to have a single flat section. The tapered section can be incorporated to preload or to turn the position of the energizer 136. For example, if the energizer 136 is a canted coil spring, the tapered section can be selected to occupy portions of the spring cavity so that when the canted coil spring 136 is situated in the spring cavity, the contour of the inside surface 154 causes the minor axis of the canted coil spring to turn from generally horizontal relative to the shaft axis. When the minor axis is turned, the force versus deflection curve of the canted coil spring changes compared to when the minor axis is orthogonal to the shaft axis.

The contoured surface of the inside surface 154 in combination with the inner flange extension 158 of the locking ring cooperate to retain the energizer 136 within the spring cavity 134. The inner flange extension 158 has a radial end tip that extends radially inwardly towards the shaft. The radial end tip projects inwardly relative to the flat section of the inner surface 154. The thickness of the inner flange extension 158 can restrict or limit the energizer 136 from translating axially within the spring cavity 134. The inner flange extension 158 also reduces the spring cavity entrance or opening 160 to make it more difficult for the energizer 136 to pop out of the cavity through the spring cavity entrance 160 during use. Without the inner flange extension 158 extending below a plane defined by the flat portion of the inside surface 154, the spring cavity entrance 160 between the end tip of the inside flange 128 and the locking ring 146 would increase and would more readily allow the energizer 136 to escape.

In the example shown, the radial end of the outer flange extension 162 of the locking flange 152 is sized to press against the interior surface 114 of the cylinder 106 to secure the locking ring 146 from axial translation during service. For example, the outer flange extension 162 of the locking ring can have an interference fit with the bore of the cylinder 106 so that the locking ring is fixed to the cylinder via the interference fit. As the seal element 126 is mechanically engaged to the locking ring 146, the seal element 126 is also secured from axial translation during service. Further, the bump or enlarged section 129 on the outside flange 130 is pressed between the notch on the deck 150 and the interior surface 114 of the cylinder 106, the enlarged section 129 functions as a sealing lip to form a static seal at the outside flange 130 that prevents fluid from flowing thereacross.

In an example, an excluder 166 is provided at an end of the center channel section 132, on the inside flange 128 side. As another way to view it, an excluder 166 is provided at an end of the inside flange 128, opposite the free end of the inside flange. The excluder 166 can be singularly formed with the body the seal element 126 and can be provided with an inside diameter (ID) that is smaller than the inside diameter of the inside flange 128 at the inside sealing lip 140. The excluder 166 can have a fin-like cross-section with a flat or blunt tip that seals against the shaft located adjacent an annular recess 168. The annular recess presents a discontinuity along the inside of the sealing flange. In other words, the inside flange 128 is separated from the excluder 166 by the annular recess 168. The tight fitting excluder 166 around the outside diameter (OD) of the shaft 108 helps to prevent fluid located external of the spring cavity 134 from entering past the excluder 166 and into the interface between the shaft and the inside flange and possibly interferes with the dynamic seal or presents a difficult media for the seal to maintain.

With reference again to FIG. 1A, the second seal assembly 104 of the seal system 100 can be the same or similar to the first seal assembly 102. For example, the second seal assembly 104 can have a seal element 126, a locking ring 146, and an energizer 136 that are the same or similar to analogous components of the first seal assembly 102. However, in the present embodiment, the tips or free ends of the inner and outer sealing flanges 128, 130 of the seal element 126 of the second seal assembly faces the seal element of the first seal assembly, i.e., the two seal assemblies face one another. In other examples, the seal system 100 can be arranged so that the first and second seal assemblies 102, 104 face away from the pressure side 50 (e.g., high pressure is from the left side and both seal assemblies face the right side) or both seal assemblies face the pressure side 50. Less preferably, both seal assemblies face away from one another.

In yet another example, rather than being housing mounted as shown in which the outer sealing flanges 130 of the two sealing assemblies 102, 104 are static against the interior surface of the cylinder 106, the sealing assemblies can instead be piston mounted. In a piston mounted configuration, the sealing flange that seals against the outside diameter (OD) of the shaft is static with the shaft and the sealing flange that seals against the interior surface 114 of the cylinder 106 is in dynamic sealing arrangement with the cylinder. The piston mounted seal system may also have the first and second seal assemblies 102, 104 arranged to face one another, both facing the pressure region, both facing away from the pressure region, or both facing one another.

In an example, the two locking rings 146 of the two seal assemblies contact one another at the parting line between them. Preferably, a washer 172 is provided between the two seal assemblies 102, 104 to space the two locking rings. The washer 172 located between the two seal assemblies can be referred to as a first washer 172a as additional washers may be incorporated with the seal system 100. The washer 172 can be made from an elastomeric material, thermoplastic material, such as PTFE, PE or PEEK, or any other special polymers; and can be incorporated in a primary seal and secondary seal configuration.

The first washer 172a may have the same non-metallic material as the sealing elements or different. In the configuration shown in FIG. 1A, the seal system 100 seals against two exterior or external environments 50, 52, external to the spring cavities 134 of the first and second seal assemblies 102, 104. Assuming region 50 is the high pressure region and the first seal assembly 102 has failed thereby allowing fluid to enter the spring cavity 134 of the first seal assembly, the washer 172 helps to prevent fluid intruding or seeping into the spring cavity 134 of the first seal assembly 102 to then migrate or seep into the spring cavity 134 of the second seal assembly 104. Thus, the second seal assembly 104 can continue to provide a seal despite failure of the first seal assembly 102 due to the presence of the first washer 172a, which has a memory lip that functions as a lip seal, as further discussed below.

In an example, the first washer 172a has a planar body 174 having a first surface 174a and an opposing second surface 174b. The first washer 172a is wedged or positioned between the two seal assemblies, such as between the two locking rings 146, 146. A memory lip 176 extends from the planar body 174 and has a curved portion. The memory lip 176 may be molded along with the planar body 174 to have the curved portion. The curved portion of the memory lip 176 is curved or arcuate such that the second surface 174*b* functions as a lip seal and contracts the OD of the shaft to seal against the shaft while the first surface 174*a* is spaced away or does not contact the shaft. When the washer is provided with the memory lip 176 that functions as a lip seal to seal against the shaft, the washer may be referred to as a lip seal. The lip seal of the first washer 172*a* provides another dynamic seal for the seal system 100, which in combination with the first and second seal assemblies 102, 104 provide three dynamic sealing points or three dynamic seals with the shaft.

The memory lip 176 defines an inside opening 180 of the washer 172, inwardly of the washer's outer perimeter. The inside opening 180, or just opening for short, has a diameter that is smaller than the OD of the shaft so as to be in interference with the shaft. Preferably, the inside diameter of the opening 180 is the same as or smaller than the inside diameter of the inside flange 128 so as to have a higher inference than the inside flange. The washer 172 is configured to be oriented so that the opening 180, such as the end edge between the two surfaces 174*a*, 174*b*, faces the high pressure region 50. Thus, the pocket 182 (FIG. 1B) immediately behind the opening 180 is oriented away from the media that the washer 172*a* is to seal against, thereby avoiding the possibility of a material buildup at the pocket 182.

With reference again to FIG. 1A, another washer 172 is provided adjacent the seal element 126 of the first seal assembly 102. This washer 172 can be referred to as a second washer 172*b* and can be the same or similar to the first washer 172*a*. The second washer 172*a* has a memory lip 176 that functions as a lip seal and an opening 180 that faces away from the first seal assembly 102, facing the external region 50. Thus, if the external region 50 is the high pressure region, incorporating the second washer 172*a* in addition to the excluder 166 will help to reduce or eliminate fluid seepage into the sealing interface between the shaft and the inside flange 128 of the first seal assembly 102. The lip seal of the second washer 172*b* provides another dynamic seal for the seal system 100, which in combination with the first washer 172*a* and the first and second seal assemblies 102, 104 provide four dynamic sealing points or four dynamic seals with the shaft.

Further, by arranging the second washer 172*b* to orientate the same way as the first washer 172*a*, the memory lip 176 of the second washer is orientated to seal against external fluid that may leak into the spring cavity 134 of the first seal assembly 102 and the memory lip 176 of the first washer is orientated to seal against external fluid that may leak into the spring cavity 134 of the second seal assembly 104 should the first seal assembly 102 fails.

The seal system may further include a washer 172 located adjacent the seal element 126 of the second seal assembly 104. This washer 172 may be referred to as a third washer 172*c* incorporated with the seal system 100. The third washer 172*c* can be the same or similar to the first washer 172*a*. The third washer 172*c* has a memory lip 176 that functions as a lip seal and an opening 180 that faces away from the second seal assembly 104, facing the external region 52. Thus, if the external region 52 is a high pressure region relative to the spring cavity 134 of the second seal assembly 104, incorporating the third washer 172*a* with the lip seal can help to reduce or eliminate fluid seepage into the sealing interface between the shaft and the inside flange 128 of the second seal assembly 104 from the external region 52. The lip seal of the third washer 172*c* provides another dynamic seal for the seal system 100, which in combination with the first washer 172*a*, the second washer 172*b*, and the first and second seal assemblies 102, 104 provide five dynamic sealing points or five dynamic seals with the shaft.

In yet another example, the seal element 126 of the second seal assembly 104 may incorporate an excluder 166, similar to that of the first seal assembly 102. In still another example, the three washers 172*a*, 172*b*, 172*c* may be omitted and the seal system 100 may be practiced simply with each seal element having an excluder. In yet another example, any combination of one and up to all three washers 172*a*, 172*b*, 172*c* may be used. For example, the two end washers 172*b*, 172*c* may be used while the first middle washer 172*a* is omitted, or the middle washer 172*a* may be used while one or both end washers 172*b*, 172*c* are omitted. In another example, only one of the end washers 172*b* or 172*c* is used. In yet other alternative embodiments, where a particular washer is used, two or more consecutively stacked washers may be used. For example, where the first middle washer 172*a* is used, two or more such washers can be used at the same location as opposed to just one middle washer, as currently shown. For example, two back-to-back washers may be used where the single middle washer 172*a* is currently shown, or three back-to-back-to-back washers may be used where the single middle washer 172*a* is currently shown. The two or more back-to-back arranged washers increase stiffness over a single washer. In other examples, the thickness of the single washer can increase so that that single washer can operate with higher stiffness compared to a single thinner washer. Other double seal embodiments discussed elsewhere herein can have similar alternative optional washer configurations.

A retaining disc 190 is provided at the insertion end 120 of the cylinder 106 to retain the various components therein following assembly. The retaining disc 190 can comprise an outer diameter and an inner diameter. The outer diameter of the retaining disc 190 is selected to form an interference fit with inside diameter of the cylinder 106, such as about 0.1 thousandths to about 5 thousandths total clearance, and can be also welded at the interference point with the cylinder 106. The inside diameter of the retaining disc 190 has a dimension that is visually larger than the shaft OD to not interfere or rub against the shaft OD during assembly and use. The space of the body of the retaining disc 190 between the ID and the OD should be sufficiently large to retain the various sealing components inside the cylinder without interfering with the movement of the shaft 108. The retaining disc 190 may be made from a metal material or a polymeric material with the specific material to select from depending on the application of the seal system.

Service grease may be packed inside the spring cavity 134 of the first seal assembly 102 and/or the spring cavity 134 of the second seal assembly 104. The type of service grease can be selected for the particular seal application. For example, if the application is for an implantable medical device, then the service grease can be a biocompatible grease, such as perfluoropolyether (PFPE) based oils and thickeners. For other non-medical applications, the grease can be a lubricant grease, such as calcium grease, lithium grease, sodium grease, etc. When incorporating service grease into one of both spring cavities 134, the grease not only provides lubrication for the dynamic interfaces between the movable shaft and the inside flanges, but the presence of the grease displaces voids and pockets inside the spring cavities, which helps to prevent external fluid from entering the same space that is already occupied by the grease.

With reference now to FIG. 2, an alternative seal system 100 provided in accordance with further aspects of the invention is shown. The present seal system 100 is similar to the seal system of FIG. 1A with a few exceptions. In the present embodiment, the exterior 113 of the cylinder 106 has been modified with an extended recess to form a shoulder 113a for assembly with the housing 110. The shoulder 113a is located further away from the insertion end 120 of the cylinder than the shoulder of the embodiment of FIG. 1A. In the present embodiment, the interior surface 114 of the cylinder 106 has been modified to have two different interior surface sections defining two different bore sections 116a, 116b. The first bore section 116a is sized with a first inside diameter (ID) and the second bore section 116b is sized with a second ID, which is larger than the first ID.

In the present embodiment, the first and second seal assemblies 102, 104 can be similar to the seal assemblies of FIG. 1A, except for their relative sizes. Whereas the OD of the first and second seal elements 126 of FIG. 1A are generally the same for fitting into the cylinder 106 with a single ID bore, the seal element 126 of the second seal assembly 104 of the present embodiment has a larger OD than the seal element 126 of the first seal assembly 102. The different sized ODs can be used to seal against two different bore sections 116a, 116b of the cylinder 106 of different sizes.

The cylinder 106 with different bore sections and the seal elements with different ODs of the present embodiment facilitate assembly of the seal system 100. For example, when installing the first seal assembly 102 into the bore of the cylinder 106, the locking ring 146 must be forced or pressed into the bore due to the interference fit between the locking flange 152 and the first bore section 116a. By sizing the cylinder to have two different bore sections 116a, 116b, the locking ring 146 of the second seal assembly 106 is pressed or forced to only slide a minimal distance into the first bore section 116a for installation and not rub or contact the second bore section 116b during assembly. Thus, installation or assembly of the second seal assembly 104 is simplified by the stepped bore of the present embodiment compared to the straight cylinder bore of other embodiments.

To accommodate the seal element 126 of the second seal assembly 104 to seal against the second bore section 116b of the cylinder, the deck 150 of the locking ring 146 is increased in thickness and diameter. In the embodiment shown, the notch for mechanically engaging the outside flange 130 and the support surface adjacent the notch has been displaced radially outwardly relative to the central axis to press the outside sealing lip of the outside flange against the larger bore section. In the present embodiment, the inside surface 154 of the locking ring of the second seal assembly 104 is the same or similar to that of the first seal assembly 102 so that similar energizers 136 may be used for both seal assemblies. However, the inside surface 154 of the second seal assembly may be adjusted so that two different energizers can be used with two different sized spring cavities, such as to provide two different sealing forces.

In the present embodiment, three washers 172 are incorporated, similar to that of FIG. 1A. While all three washers 172 may include memory lips that function as sealing lips as previously discussed, in the present embodiment, the second washer 172b and the third washer 172c can be standard washers, which is understood as being generally planar and having an outer perimeter and an inner perimeter defining an inside opening, without a memory lip. In an example, the inside openings of the second and third washers 172b, 172c are sized to have approximately a size-on-size fit with the shaft OD. The size-on-size fit can sufficiently deter viscous fluid from entering into the interface between the shaft and the inside flange and possibly interferes with the dynamic seal or presents a difficult media for the seal to maintain. In other embodiments, the standard washers can be sized with an inside opening with a size-on size fit or slight interference fit with the shaft OD, in the order of about 0.1 to 2 thousandths.

In the present embodiment, the retainer disc 190 is sized to engage the larger second bore section 116b. For example, the outside diameter of the retainer disc 190 is sized to have an interference fit with the second bore section 116 to retain the various components within the bore.

With reference now to FIG. 3, an alternative seal system 100 provided in accordance with further aspects of the invention is shown. The present seal system 100 is similar to the seal system of FIG. 1A with a few exceptions. In the present embodiment, the cylinder 106 has generally the same inside diameter but is a split cylinder and comprises a first cylinder section 106a and a second cylinder section 106b. The split cylinder has a stepped split line 192 wherein one of the two cylinder sections has an opening 194 with an inside diameter for receiving a projection 196 of the other cylinder to assemble the two cylinder sections together. In an example, the opening with the inside diameter and the projection with an outside diameter are sized with an interference fit, to prevent unwanted separation. Although the second cylinder section 106b is shown with the opening and the first cylinder section 106a is shown with a projection, the two can reverse.

Each cylinder section has an open end or insertion end and a closed end with a retaining wall 118. The first seal assembly 102 can be inserted into the first cylinder section 106a through the insertion end and retained at the opposite end by the retaining wall 118. Similarly, the second seal assembly 104 can be inserted into the second cylinder section 106b through the insertion end of the second cylinder section and retained at the opposite end by the retaining wall 118. Both retaining walls 118 can have inside diameters that are sufficiently large so as to not rub or contact the shaft OD during installation and use.

Three gaskets 172 may be incorporated with the present seal system. In the present embodiment, the three gaskets can each comprise a memory lip. Alternatively, the gaskets can be mixed with both a standard gasket and one with a memory lip. As shown, the first and the second gaskets 172a, 172b are both provided with memory lips to function as sealing lips and the third gasket 172c can be a standard gasket. The first gasket 172a may be positioned within the first cylinder section 106a or the second cylinder section 106b. As shown, the first gasket 172a is positioned inside the bore of the first cylinder section with the outside diameter of the gasket pressed against the inside diameter of the first bore section. Further, the first gasket 172a can be sized with a thickness that gets compressed between the two locking rings of the two seal assemblies 102, 104 when the seal system is fully assembled as shown.

FIG. 4 shows an alternative seal system 100 provided in accordance with further aspects of the invention. The present seal system 100 is similar to the seal system of FIG. 1A with a few exceptions. In the present embodiment, the cylinder 106 has generally the same inside diameter. Alternatively, the seal system 100 can omit the cylinder and be assembled directly into the housing 110 without the cylinder. Similar washers may also be used with the present seal assembly, except for the middle washer.

The present seal system 100 comprises a first seal assembly 102 and a second seal assembly 104 each with a seal element 126 having generally the same ID and OD and arranged to face one another. However, in the present embodiment, the locking ring 146 is a combination locking ring 146a. That is, the combination locking ring 146a has a single locking flange 152 for locking against the interior of the cylinder or housing but has two different decks 150 with each comprising a notch for mechanically engaging the respective outside flange 130 of the respective seal element. The two decks 150 are located to either side of the locking flange 152. The combination locking ring 146a also has a single inner flange extension 158. The locking flange 152 and the inner flange extension 158 align generally along the same axial position and the two decks are located on either side of this aligned structure. The length of the single inner flange extension 158 can be selected to adjust the spring cavity opening 160 of both the first and second seal assemblies as desired, to restrict the two energizers 136 from escaping out through the respective spring cavity opening during use.

With reference now to FIG. 5, a seal system 100 is shown in accordance with still further aspects of the invention. The seal system 100 of the present embodiment comprises a seal assembly 102 having a seal element 126, a locking ring 146, a washer 172, and an energizer 136 located in the spring cavity 134. The seal assembly 102 may be mounted directly in a gland of a housing 110 to seal against the housing and the dynamic shaft 108 without a cylinder or a can. However, the seal assembly 102 of the present embodiment may be pre-mounted in a cylinder 106. The seal system 100 is further provided with a washer 172 having a memory lip 176 that functions as a sealing lip, as previously discussed. Thus, the present seal system 100 is understood as a double seal assembly with two dynamic seals or two dynamic sealing points.

The seal element 126 has an inside flange 128, an outside flange 130, and a center channel section 132 that together define a spring cavity 134. An energizer 136, which can be a canted coil spring, is located in the spring cavity and biases the inside and outside flanges away from one another. The spring cavity 134 is formed without a locking ring and the shape of the spring cavity is defined by the inside flange, the outside flange, and the center channel section only. The enlarged end section 129 of the outer flange 130 can be sized with an OD that presses against the interior of the housing or cylinder to seal thereagainst.

A retaining lip 200 can extend radially inwardly from an end of the outside flange towards the shaft axis or central axis of the seal assembly to reduce the spring cavity opening 160. The retaining lip 200 can be singularly formed with the seal element 126 and the length of the retaining lip 200 can be selected to minimize the spring cavity opening 160.

A notch 202 is provided on the exterior of the outside flange 130 to mechanically engage the projection on the locking ring 146, which is sized with an OD to form an interference fit with the housing or cylinder. In the assembled configuration, both the enlarged end section 129 of the outside flange 130 and the locking ring 146 contact the interior of the housing or cylinder.

The locking ring 146 of the present embodiment comprises first flange section 206 attached to a second flange section 208 at an intersection. In the example shown, the first flange section 206 is generally planar and extends transversely to the shaft. The first flange section 206 functions as a retaining disc to secure the various seal components within the cavity of the housing or cylinder, similar to the retaining disc of FIG. 1A.

The second flange section 208 extends in the axial direction relative to the shaft. In the example shown, the flange section 208 has an end projection 210 on an outside surface to define an OD that is larger than the remaining OD part of the second flange. The outside projection 210 provides an interference with the inside surface of the cylinder or housing. In some example, the projection 210 can be located closer to the intersection of the two flange sections 206, 208 than at the opposite end of the second flange section.

Interiorly, the second flange section 208 of the locking ring 146 has a projection 212 on the inside surface for mechanically engaging the notch 202 of the outside flange 130 of the sealing element 126. A space or gap is provided between the vertical lip of the inside projection 212 and the wall of the first flange section 206. The gap is sized and shaped to accommodate the width of the center channel section 132 and the washer 172 to retain the two therebetween during assembly and service.

The washer 172 has a memory lip 176 that functions as a sealing lip, as previously discussed. In the present embodiment, the memory lip 176 is orientated to face the outside region 52 while the free end of the inside flange 128 of the seal element 126 is oriented to face the outside region 50. In an example, a second washer may be incorporated between the retaining wall 118 and the seal element 126. The second washer can be a standard washer or one with a memory lip. Adding the second washer can allow the use of service grease in the spring cavity. FIG. 5A shows the embodiment with the second washer between the retaining wall and the seal element.

With reference now to FIG. 6, a seal system 100 is shown in accordance with still further aspects of the invention. The seal system 100 of the present embodiment comprises a seal assembly 102 mounted directly in the gland of a housing 110. Alternatively, the housing can be a cylinder 106 and the seal assembly 102 is mounted to the cylinder as a pre-packaged seal system before being mounted inside the gland of the housing. The present seal assembly 102 comprises a seal element 126, a locking ring 146, a washer 172, and an energizer 136 located in a spring cavity 134. FIG. 6A shows the embodiment with the washer 172. The present seal assembly 102 is similar to the first seal assembly 102 of FIG. 1A. The present seal assembly 102 may be used as a single seal to prevent higher interior fluid pressure from leaking outside, or to seal higher environmental pressure from leaking inside into the lower pressure spring cavity. In some examples, a washer may be placed in abutting contact with the locking ring 146. A retainer disc may be placed adjacent the washer to retain the washer against the locking ring. The washer can be a standard washer or one with a memory lip. Adding a washer can allow the use of service grease in the spring cavity 134 of the seal assembly 102. FIG. 6B shows the embodiment in which a washer is placed in abutting contact with the locking ring 146 with a retainer disc and wherein service grease can be placed in the spring cavity.

With reference now to FIG. 7, a seal bearing system 240 in accordance with aspects of the invention is shown. The seal bearing system 240 shares many aspects as the seal system 100 discussed elsewhere herein. As shown, the seal bearing system 240 comprises a cylinder 106 with a retaining wall 118 and an open end or insertion end 120 for mounting the various seal bearing components, similar to the cylinder of FIG. 1A. Exteriorly, the cylinder may be shaped with shoulders, flanges, etc. for mating with equipment housing 110, which can be any number of devices, such as a pump, a mixer, a valve, a blower, etc. having a shaft 108 movable within the housing 110.

Internally, the cylinder 106 has a stepped bore with a first bore section 116a and a second bore section 116b, similar to the cylinder of FIG. 2. A first seal assembly 102, a second seal assembly, and two washers 172a, 172b are located inside the bore 116, also similar to the seal system of FIG. 2. The first and second washers 172a, 172b can be of a standard type with a straight inside opening without a memory lip. The inside opening of the standard washers can be smaller than the shaft OD to generate an interference fit. In other examples, the two washers 172a, 172b can each have a memory lip, or only one of the two can have a memory lip, the one between the two locking rings or the one adjacent the retaining wall 118. Further, while the two seal elements 126 face one another, they can be oriented to both face the exterior region 50, be oriented to both face the exterior region 52, or oriented to face away from one another.

A retaining disc 190 is placed in abutting contact with the seal element 126 of the second seal assembly 104. The retaining disc can have an interference fit with the cylinder 106 and incorporated to retain the various seal components inside the bore 116. In an alternative embodiment, a washer 172c is placed in abutting contact with the seal element 126 of the second seal assembly 104. The washer 172c can be a standard washer having an inside opening with a size-on-size fit with the shaft OD. The washer 172c can be thicker than the first and second washers 172a, 172b to separate the second seal assembly 104 from the bearing assembly 244.

In an example, the bearing assembly 244 comprises an outer ring 246, an inner ring 248, and a cage 250 for retaining a plurality of rolling elements 252 (only one shown) in retaining sockets. The various components of the bearing assembly 244 are typically made from a metal material, which can all be the same material or more likely from a variety of different metal materials. The inner ring 248 is configured to tightly fit around the exterior of the shaft 108 and rotate with the shaft along with the rolling elements 252, which are held by the cage 250 as they rotate with the shaft in spaced apart relationship. The inner ring 248 can have an inside diameter configured to fit around the shaft in an interference fit and an outer diameter, relative to the inside diameter, defining a thickness therebetween. The inner ring 122 also has a width and is sized and shaped to accommodate selected rolling elements.

The outer ring 246 is tightly fitted against the interior surface of the cylinder 106 and is held stationary to the cylinder when the inner ring 248, the cage 250, and the rolling elements 252 rotate with the shaft 108. The outer ring 246 can have an inside diameter configured to contact the rolling elements 126 and an outer diameter configured to fit against the interior of the cylinder 106 in an interference fit. The inside diameter and the outside diameter of the outer ring 246 define a thickness therebetween. The outer ring 246 has a width and is sized and shaped to accommodate selected rolling element types.

In an example, the bearing assembly 244 is a ball bearing assembly and the rolling elements 252 are metal balls or spherical balls. When the bearing assembly 244 is a ball bearing assembly, the outer and inner rings 246, 248 can comprise inner and outer bearing races for the plurality of balls 252 to contact and rotate against. In other examples, the bearing assembly 244 can be a different bearing type, such as a roller bearing assembly, a tapered or angled roller bearing assembly, a thrust ball bearing assembly or a roller bearing assembly, etc. Rolling elements of a roller bearing assembly and tapered roller bearing assembly can embody solid rotating cylinders or solid tapered cylinders.

As shown, the outer ring 246 comprises two exterior grooves defining three raised projections. In other examples, one or more than two exterior grooves and two or more than three raised projections can be incorporated. Further, for each projection, relatively smaller grooves, such as micro-grooves, can be provided on the exterior thereof to facilitate assembly of the outer ring 246 into the bore of the cylinder 106. The grooves, when incorporated, reduce interference and friction and facilitate assembly.

The bearing assembly 244, the seal assemblies 102, 104, and the washers 172a, 172b, 172c can be assembled to the cylinder in a pre-packaged configuration to form a seal bearing system 240 in accordance with aspects of the invention. The pre-packaged seal and bearing assembly is thereafter ready for mounting, as a unit, onto the shaft 108. The assembly can then be installed into the housing 110.

Service grease, as discussed above, may be incorporated in the spring cavities 134 of one or both seal assemblies 102, 104. The same or different service grease may be used with the bearing assembly 244 to provide lubrication for the rolling elements 252.

With reference now to FIG. 8, a pre-packaged seal and bearing system 240 is shown, similar to the pre-packaged system of FIG. 7 with a few exceptions. The pre-packaged seal and bearing system 240 of the present embodiment has a split cylinder 106 to facilitate installation of the seal assemblies, washers, and bearing assembly, similar to the discussions of the split cylinder of FIG. 3. A first washer 172a with a memory lip 176 can also be incorporated with the present seal and bearing system 240 instead of a standard washer between the two seal assemblies.

FIG. 9 is a cross-sectional side view of the pre-packaged seal and bearing system 240 of FIG. 8 mounted to a housing having an additional bearing assembly 244a. The seal and bearing system 240 is engaged to or installed within a housing 110, which can have more than one housing section 110a. For example, the pre-packaged seal and bearing system 240 can first be mounted onto the shaft 108 and then the combination mounted to the housing 100.

In the example shown, a second bearing assembly 244a is mounted to the housing and shaft and spaced from the first bearing assembly 240 of the pre-packaged seal and bearing system 240. This configuration shows how the pre-packaged seal and bearing system 240 may be used in a device in which a gap between the first and second bearing assemblies 244, 244a, called a device chamber 254, can be used to house any number of device components, such as a rotor of a motor, a stator of a motor, an oil sump, valve packing materials, fan blades, etc. Having the bearing assemblies 244, 244a located on either end of the device chamber 254 provides support and stability when the shaft rotates. The pre-packaged seal and bearing system 240 provides a single sealing solution with multiple components that can be adapted for multiple applications. For example, the seal assemblies 102, 104 can be orientated with different configurations, either facing one another, both facing the high pressure region, etc., for different applications. The pre-packaged seal and bearing system 240 can also be modified to have different gaskets for added sealing points, such as by utilizing one or more gaskets with memory lips that serve as sealing lips. The cylinder 106 can also have a straight bore, a stepped bore, and can include a split to facilitate assembly.

Still further, service grease may be included in the spring cavities 134 to occupy the spring cavities so that external fluid is less prone to enter into the same space. The service grease can be selected to be compatible with the particular application. For example, if the housing 110 is part of a medical implantable device, the service grease must be biocompatible.

In yet another example, the pre-packaged assembly is a pre-packaged seal system 100, such as the seal system of FIG. 1A, 2, or 3, without a bearing assembly. The bearing assembly can instead be mounted outside of or external to the cylinder 106.

A still further aspect of the invention is a method of using seal assemblies, seal systems, pre-packaged seal systems, and pre-packaged seal and bearing assemblies as shown and described.

A still further aspect of the invention is a method of manufacturing or making seal assemblies, seal systems, pre-packaged seal systems, and pre-packaged seal and bearing assemblies as shown and described.

The various seal assemblies, gaskets, pre-packaged seal systems, and pre-packaged seal and bearing systems can be interchangeable unless the components are mechanically or operationally conflicting. For example, the cylinder of FIG. 7 may be replaced with the split cylinder of FIG. 8, and the washers of FIG. 7 may be replaced with the washers with memory lips of FIG. 1A. Thus, the various embodiments described herein are intended to be interchangeable where they are compatible to do so.

Although limited embodiments of seal assemblies, gaskets, pre-packaged seal systems, and pre-packaged seal and bearing systems and their components have been specifically described and illustrated herein, many modifications and variations will be apparent to those skilled in the art. Accordingly, it is to be understood that the seal assemblies, gaskets, pre-packaged seal systems, and pre-packaged seal and bearing systems and their components constructed according to principles of the disclosed device, system, and method may be embodied other than as specifically described herein. The disclosure is also defined in the following claims.

What is claimed is:

1. A seal system comprising:
    a housing cylinder having a body, an interior surface defining a bore, a retaining end having a retaining wall at one end of the bore, and an insertion end at an opposite end of the bore;
    a seal assembly located in the bore of the housing cylinder, the seal assembly comprising a seal element, a locking ring, and an energizer; wherein the seal element comprising a spring cavity formed by an inside flange, an outside flange, and a center channel section having the energizer located therein, and wherein the inside flange defining an inside diameter and the locking ring being pressed against the bore and mechanically engaged to the outside flange;
    a washer in contact with the seal element and the retaining wall, the washer comprising an outside perimeter and an inside perimeter defining an opening;
    a shaft having a length and an outside diameter;
    wherein the shaft projects through the opening of the washer and the inside diameter of the seal element; and
    wherein the opening of the washer and the inside diameter of the seal element are smaller than the outside diameter of the shaft to form respective interference fit with the shaft.

2. The seal system of claim 1, wherein the washer contacts the retaining wall along a surface of the washer from the outside perimeter to a location proximate a memory lip having a curved portion at the opening of the washer.

3. The seal system of claim 2, wherein the washer contacts the center channel section of the seal element proximate a radial outer most end of the center channel section.

4. The seal system of claim 3, wherein the the washer is spaced from the center section at a point proximate an excluder located on the center channel section, wherein the excluder having an inside diameter with a dimension that is smaller than the outside diameter of the shaft.

5. The seal system of claim 4, wherein the outside flange of the sealing element is pressed against the bore of the housing cylinder.

6. The seal system of claim 1, further comprising an excluder at an end of the center channel section having an inside diameter with a dimension that is smaller than the outside diameter of the shaft.

7. The seal system of claim 6, further comprising grease disposed in the spring cavity.

8. The seal system of claim 1, wherein the energizer is a canted coil spring comprising a plurality of interconnected coils that bias the inside flange away from the outside flange.

9. The seal system of claim 8, wherein the seal element and the locking ring are mechanically engaged at the outside flange.

10. The seal system of claim 9, wherein the washer is made from an elastomeric material or a thermoplastic material.

11. The seal system of claim 10, wherein the locking ring has a body with an inside surface, and wherein the plurality of interconnected coils bias against the inside surface and the inside flange.

12. A seal system comprising:
    a housing cylinder having a body, an interior surface defining a bore, a retaining end having a retaining wall at one end of the bore, and an insertion end at an opposite end of the bore;
    a seal assembly located in the bore of the housing cylinder, the seal assembly comprising a seal element, a locking ring pressed against the bore of the housing cylinder, and a canted coil spring; wherein the seal element comprises a spring cavity formed by an inside flange, an outside flange, and a center channel section, and wherein the inside flange defines an inside diameter and the canted coil spring is located in the spring cavity;
    a washer located in the bore and in contact with the seal element and the retaining wall, the washer comprising an outside perimeter and an inside perimeter defining an opening;
    a shaft having a length and an outside diameter, the shaft projecting through the opening of the washer and the inside diameter of the seal element;
    an excluder at an end of the center channel section and located adjacent an annular recess, wherein the excluder has an inside diameter having a dimension that is smaller than the outside diameter of the shaft; and
    wherein the washer is separately formed from the seal element.

13. The seal system of claim 12, wherein the outside flange is pressed against the bore of the housing cylinder by the locking ring.

14. The seal system of claim 13, wherein the inside flange and the outside flange both point away from the retaining wall.

15. The seal system of claim 14, wherein a retaining disc comprising a surface is located at the insertion end and spaced from the retaining wall.

16. The seal system of claim 15, wherein the washer comprises a memory lip having a curved portion at the opening of the washer.

17. The seal system of claim 16, further comprising grease disposed in the spring cavity.

18. The seal system of claim 14, wherein the energizer is a canted coil spring comprising a plurality of interconnected coils that bias against the inside flange and the locking ring.

19. The seal system of claim 18, wherein the seal element and the locking ring are mechanically engaged at the outside flange.

20. The seal system of claim 18, wherein the shaft is part of a motor or a pump.

21. The seal system of claim 12, wherein the washer is made from an elastomeric material or a thermoplastic material.

22. A seal system comprising:
a housing cylinder having a body, an interior surface defining a bore, a retaining end having a retaining wall at one end of the bore, and an insertion end at an opposite end of the bore;
a seal assembly located in the bore of the housing cylinder, the seal assembly comprising a seal element a spring cavity formed by an inside flange, an outside flange, and a center channel section and having an energizer located therein, wherein the inside flange defines an inside diameter, and wherein the inside flange and the outside flange point in a direction of the retaining wall;
a washer in contact with the center channel section and spaced from the retaining wall, the washer comprising an outside perimeter and an inside perimeter defining an opening;
a shaft having a length and an outside diameter, the shaft is located in the opening of the washer and the inside diameter of the seal element; and
a retaining disc pressed against the bore of the housing cylinder and in contact with the washer for retaining the seal assembly and the washer within the bore of the housing cylinder.

23. The seal system of claim 22, wherein the retaining disc is a first flange section of a locking ring and the first flange section extends from a second flange section, and wherein the second flange section is mechanically engaged to the outside flange of the seal element.

24. The seal system of claim 23, wherein the second flange section comprises an end projection that is pressed against the bore.

25. The seal system of claim 22, further comprising service grease located in the spring cavity.

26. The seal system of claim 22, wherein the seal element and the locking ring are mechanically engaged at the outside flange.

27. The seal system of claim 22, wherein the washer comprises a memory lip having a curved portion at the opening that points away from the retaining wall.

28. The seal system of claim 27, wherein the energizer is a canted coil spring comprising a plurality of interconnected coils that bias the inside flange away from the outside flange.

29. A seal system comprising:
a housing cylinder having a body, an interior surface defining a bore, a retaining end having a retaining wall at one end of the bore, and an insertion end at an opposite end of the bore;
a seal assembly located in the bore of the housing cylinder, the seal assembly comprising a seal element, a locking ring pressed against the bore of the housing cylinder, and a canted coil spring; wherein the seal element comprises a spring cavity formed by an inside flange, an outside flange, and a center channel section, wherein the inside flange defines an inside diameter, and wherein the canted coil spring is biased against the locking ring and the inside flange;
a washer located in the bore between the seal element and the retaining wall, the washer comprising an outside perimeter and a memory lip having an opening at an inside perimeter;
a shaft having a length and an outside diameter, the shaft is located in the opening of the washer and the inside diameter of the seal element;
an excluder at an end of the center channel section and located adjacent an annular recess, wherein the excluder has an inside diameter having a dimension that is smaller than the outside diameter of the shaft;
wherein the washer is separately formed from the seal element and the memory lip points away from the excluder; and
wherein the inside flange and the outside flange of the seal element point away from the retaining wall.

30. The seal system of claim 29, wherein the memory lip is pointing away from the excluder.

* * * * *